US009998389B2

(12) United States Patent
Pannell

(10) Patent No.: US 9,998,389 B2
(45) Date of Patent: *Jun. 12, 2018

(54) METHOD AND APPARATUS FOR BLOCKING TRANSMISSION OF FRAMES FROM A NETWORK DEVICE

(71) Applicant: Marvell World Trade Ltd., St. Michael (BB)

(72) Inventor: Donald Pannell, Cupertino, CA (US)

(73) Assignee: Marvell World Trade LTD., St. Michael (BB)

( * ) Notice: Subject to any disclaimer, the term of this patent is extended or adjusted under 35 U.S.C. 154(b) by 0 days. days.

This patent is subject to a terminal disclaimer.

(21) Appl. No.: 15/002,462

(22) Filed: Jan. 21, 2016

(65) Prior Publication Data
US 2016/0142332 A1 May 19, 2016

Related U.S. Application Data

(63) Continuation of application No. 14/658,747, filed on Mar. 16, 2015, now Pat. No. 9,246,835, which is a
(Continued)

(51) Int. Cl.
*H04L 12/865* (2013.01)
*H04L 12/875* (2013.01)
(Continued)

(52) U.S. Cl.
CPC ........ *H04L 47/6215* (2013.01); *H04J 3/0635* (2013.01); *H04L 47/245* (2013.01);
(Continued)

(58) Field of Classification Search
None
See application file for complete search history.

(56) References Cited

U.S. PATENT DOCUMENTS 5,774,700 A 6/1998 Fisch et al.
5,822,381 A 10/1998 Parry et al.
(Continued)

FOREIGN PATENT DOCUMENTS

CN 101364932 A 2/2009
CN 101414958 A 4/2009
(Continued)

OTHER PUBLICATIONS

PCT International Search Report and Written Opinion of the International Searching Authority dated Dec. 12, 2013 corresponding to PCT/US2013/058954, 11 pages.
(Continued)

*Primary Examiner* — Ayaz R Sheikh
*Assistant Examiner* — Tarell A Hampton

(57) ABSTRACT

A network device including first and second queues, a timing module and a shaper. The first queue receives first frames. The second queue receives second frames. A priority level of the second frames is lower than a priority level of the first frames. The timing module determines a start time of a burst period of the first frames. The first frames are transmitted from the network device during the burst period. The shaper determines: a size of a head-of-line frame of the second frames; a predetermined maximum size of one of the second frames; or a predetermined minimum size of one of the second frames. The shaper determines whether to block transmission of the head-of-line frame from the network device based on (i) the start time, (ii) the size of the head-of-line frame, (iii) the predetermined maximum size, or (iv) the predetermined minimum size.

28 Claims, 23 Drawing Sheets

Related U.S. Application Data continuation of application No. 13/415,112, filed on Mar. 8, 2012, now Pat. No. 8,982,896.

(60) Provisional application No. 61/451,525, filed on Mar. 10, 2011, provisional application No. 61/452,482, filed on Mar. 14, 2011, provisional application No. 61/552,648, filed on Oct. 28, 2011.

(51) Int. Cl.

| | | |
|---|---|---|
| *H04L 12/879* | (2013.01) | |
| *H04J 3/06* | (2006.01) | |
| *H04L 12/863* | (2013.01) | |
| *H04L 12/851* | (2013.01) | |
| *H04L 12/841* | (2013.01) | |

(52) U.S. Cl.
CPC ........ *H04L 47/283* (2013.01); *H04L 47/6235* (2013.01); *H04L 47/6245* (2013.01); *H04L 49/901* (2013.01)

(56) References Cited

U.S. PATENT DOCUMENTS

| | | | |
|---|---|---|---|
| 6,038,230 A | 3/2000 | Ofek | |
| 6,707,791 B1 | 3/2004 | Sundqvist | |
| 6,707,821 B1 | 3/2004 | Shaffer et al. | |
| 6,785,236 B1* | 8/2004 | Lo | H04L 12/5693 370/235 |
| 7,120,113 B1 | 10/2006 | Zhang et al. | |
| 7,426,206 B1 | 9/2008 | Ofek et al. | |
| 7,668,103 B1 | 2/2010 | Pannell et al. | |
| 7,924,711 B2 | 4/2011 | Rosen | |
| 8,171,152 B2 | 5/2012 | White et al. | |
| 8,238,250 B2 | 8/2012 | Fung | |
| 8,379,644 B1 | 2/2013 | Pannell | |
| 8,417,934 B2 | 4/2013 | Kondapalli et al. | |
| 8,838,787 B2 | 9/2014 | Getter et al. | |
| 8,937,974 B1 | 1/2015 | Pannell | |
| 8,953,580 B2 | 2/2015 | Yang et al. | |
| 8,982,896 B2 | 3/2015 | Pannell | |
| 2002/0118692 A1 | 8/2002 | Oberman et al. | |
| 2002/0174255 A1* | 11/2002 | Hayter | G06F 13/128 709/250 |
| 2003/0142696 A1 | 7/2003 | Holmeide et al. | |
| 2004/0052213 A1* | 3/2004 | Cankaya | H04Q 11/0066 370/235 |
| 2004/0114516 A1 | 6/2004 | Iwata et al. | |
| 2004/0202191 A1 | 10/2004 | Vrabel | |
| 2005/0111362 A1* | 5/2005 | Freytsis | H04L 47/564 370/230 |
| 2006/0239333 A1 | 10/2006 | Albert et al. | |
| 2006/0268692 A1* | 11/2006 | Wright | H04L 47/10 370/229 |
| 2008/0095053 A1 | 4/2008 | Chen et al. | |
| 2009/0135958 A1 | 5/2009 | Rueckriem et al. | |
| 2012/0163521 A1 | 6/2012 | Kirrmann et al. | |
| 2012/0230348 A1 | 9/2012 | Pannell | |
| 2013/0215743 A1 | 8/2013 | Pannell | |
| 2014/0071823 A1 | 3/2014 | Pannell | |
| 2014/0341032 A1 | 11/2014 | Thaler | |
| 2015/0365337 A1 | 12/2015 | Pannell | |
| 2015/0365338 A1 | 12/2015 | Pannell | |

FOREIGN PATENT DOCUMENTS

| | | |
|---|---|---|
| CN | 101548510 A | 9/2009 |
| CN | 102132530 A | 7/2011 |
| WO | WO-2012104623 A2 | 8/2012 |
| WO | WO-2012122382 A1 | 9/2012 |
| WO | WO-2013126630 A1 | 8/2013 |
| WO | WO-2014043092 A1 | 3/2014 |

OTHER PUBLICATIONS

PCT International Search Report and Written Opinion of the International Searching Authority dated Jun. 28, 2012 corresponding to PCT/US2012/028290; 10 pages.

Yoram Ofek et al: "The Integrated Metanet Architecture: A Switch-Based Multimedia LAN for Parallel Computing and Real-Time Traffic", Proceedings of the Conference on Computer Communications (INFOCOM), Los Alamitos, IEEE Comp. Soc. Press., US, vol. 2, Jun. 12, 1994, pp. 802-811.

Pannell, Don, "AVB—Generation 2 Latency Improvement Options", Mar. 2011, IEEE 802.1, 46 pages.

Finn, Norman, "Preemptive Transmission advantages", Jan. 2012, IEEE 802.1, 12 pages.

Min-Jun Kim et al.; "Frame Forwarding Rules for Link Utilization in IEEE 802.1 AVB Networks"; Advanced Language Processing and Web Information Technology; 2008. ALPIT '08. International Conference on, IEEE, Piscataway, NJ, USA; Jul. 23, 2008; pp. 509-512.

Yong-Do Choi et al.; "A Forwarding Method on the IEEE 802.1 AVB"; Advanced Language Processing and Web Information Technology, 2008. ALPIT '08; International Conference on, IEEE, Piscataway, NJ, USA, Jul. 23, 2008; pp. 497-502.

PCT International Search Report and Written Opinion of the International Searching Authority dated Jun. 13, 2013 corresponding to PCT/US2013/027223; 7 pages.

IEEE Std. 802.11-2012; IEEE Standard for Information technology—Telecommunications and information exchange between systems Local and metropolitan area networks—Specific requirements; Part 11: Wireless LAN Medium Access Control (MAC) and Physical Layer (PHY) Specifications; IEEE Computer Society; Sponsored by the LAN/MAN Standards Committee; Mar. 29, 2012; 2793 pages.

IEEE Std 802.11a-1999 (Supplement to IEEE Std 802.11-1999) Supplement to IEEE Standard for Information technology—Telecommunications and information exchange between systems—Local and metropolitan area networks-Specific requirements—Part11: Wireless LAN Medium Access Control (MAC) and Physical Layer (PHY) specifications: High-Speed Physical Layer in the 5 GHZ Band; LAN/MAN Standards Committee of the IEEE Computer Society; Sep. 16, 1999; 91 pages.

IEEE Std. 802.11b; Supplement to IEEE Standard for Information technology—Telecommunications and information exchange between systems—Local and metropolitan area networks—Specific Requirements—Part 11: Wireless LAN Medium Access Control (MAC) and Physical Layer (PHY) specifications: Higher-Speed Physical Layer Extension in the 2.4 GHz Band; LAN/MAN Standards Committee of the IEEE Computer Society; Sep. 16, 2009; 96 pages.

IEEE P802.11g/D8.2 Draft Supplement to Standard [for] Information Technology—Telecommunications and information exchange between systems—Local and metropolitan area networks—Specific requirements—Part 11: Wireless LAN Medium Access Control (MAC) and Physical Layer (PHY) specifications: Further Higher Data Rate Extension in the 2.4 GHz Band; LAN/MAN Standards Committee of the IEEE Computer Society; Apr. 2003; 69 pages.

Kiran Gunnam et al.; "Multi-Rate Layered Decoder Architecture for Block LDPC Codes of the IEEE 802.11n Wireless Standard"; 2007; pp. 1645-1648.

802.16-2009 IEEE Standard for Local and Metropolitan area networks; Part 16: Air Interface for Broadband Wireless Access Systems; IEEE Computer Society and the IEEE Microwave Theory and Techniques Society; Sponsored by the LAN/MAN Standard Committee; May 29, 2009; 2082 pages.

IEEE Std 802.20-2008; IEEE Standard for Local and metropolitan area networks; Part 20: Air Interface for Mobile Broadband Wireless Access Systems Supporting Vehicular Mobility—Physical and Media Access Control Layer Specification; IEEE Computer Society; Sponsored by the LAN/MAN Standards Committee; Aug. 29, 2008; 1032 pages.

"Specification of the Bluetooth System" Master Table of Contents & Compliance Requirements—Covered Core Package version: 4.0; Jun. 30, 2010; 2302 pages.

(56) References Cited

OTHER PUBLICATIONS

IEEE P802.11ac / D2.0; Draft Standard for Information Technology—Telecommunications and information exchange between systems—Local and metropolitan area networks—Specific requirements; Part 11: Wireless LAN Medium Access Control (MAC) and Physical Layer (PHY) specifications; Amendment 4: Enhancements for Very High Throughput for Operation in Bands below 6 GHz; Prepared by the 802.11 Working Group of the 802 Committee; Jan. 2012; 359 pages.

IEEE P802.11ad / D5.0 (Draft Amendment based on IEEE P802.11REVmb D10.0) (Amendment to IEEE 802.11REVmb D10.0 as amended by IEEE 802.11ae D5.0 and IEEE 802.11aa D6,0); Draft Standard for Information Technology—Telecommunications and Information Exchange Between Systems—Local and Metropolitan Area Networks—Specific Requirements; Part 11: Wireless LAN Medium Access Control (MAC) and Physical Layer (PHY) Specifications—Amendment 3: Enhancements for Very High Throughput in the 60 GHz Band; Sponsor IEEE 802.11 Committee of the IEEE Computer Society; Sep. 2011; 601 pages.

IEEE P802.11ah / D1.0 (Amendment to IEEE Std 802.11REVmc / D1.1, IEEE Std 802.11ac / D5.0 and IEEE Std 802.11af / D3.0) Draft Standard for Information technology—Telecommunications and information exchange between systems Local and metropolitan area networks—Specific requirements; Part 11: Wireless LAN Medium Access Control (MAC) and Physical Layer (PHY) Specifications; Amendment 6: Sub 1 GHz License Exempt Operation; Prepared by the 802.11 Working Group of the LAN/MAN Standards Committee of the IEEE Computer Society; Oct. 2013; 394 pages.

IEEE Std 802.11h 2003 (Amendment to IEEE Std 802.11, 1999 Edition (Reaff 2003) as amended by IEEE Stds 80211a 1999, 802.11b 1999, 802.11b 1999/Cor 1-2001, 802.11d 2001, and 802.11g 2003); IEEE Standard for Information technology—Telecommunications and information exchange between systems—Local and metropolitan area networks—Specific requirements, Part 11: Wireless LAN Medium Access Control (MAC) and Physical Layer (PHY) specifications, Amendment 5: Spectrum and Transmit Power Management Extensions in the 5 GHz band in Europe; IEEE Computer Society, Sponsored by the LAN/MAN Standards Committee; Oct. 14, 2003; 75 pages.

IEEE Std 802.1Qav-2009 (Amendment to IEEE Std. 802.1Q-2005) IEEE Standard for Local and metropolitan area networks—Virtual Bridged Local Area Networks, Amendment 12: Forwarding and Queuing Enhancements for Time-Sensitive Streams; IEEE Computer Society, Sponsored by the LAN/MAN Standards Committee; Jan. 5, 2010; 87 pages.

Soren Rumpf et al.; "Software Stacks for Mixed-critical Applications: Consolidating IEEE 802.1 AVB and Time-triggered Ethernet in Next-generation Automotive Electronics"; Department of Computer Science Hamburg University of Applied Sciences, Germany; 2014; 5 pages.

802.1AS—Timing and Synchronization; "Standard for Local and Metropolitan Area Networks—Timing and Synchronization for Time-Sensitive Applications in Bridged Local Area Networks"; Editor—Geoff Garner; May 25, 2006; 7 pages.

IEEE 802.1 Qbv Draft 5C's for Time Aware Shaper enhancement to 802.1Q; Version 2, Edited by Don Pannell at Marvell; Jan. 2012; 7 pages.

PCT International Search Report and Written Opinion of the International Searching Authority dated Sep. 11, 2015 corresponding to PCT/US2015/034879; 11 pages.

First Office Action dated Feb. 28, 2017 corresponding to Chinese Patent Application No. 201380047085.2, 8 pages.

Office Action for Chinese Application No. CN 201380010506.4 dated Oct. 25, 2016; 5 pages.

\* cited by examiner

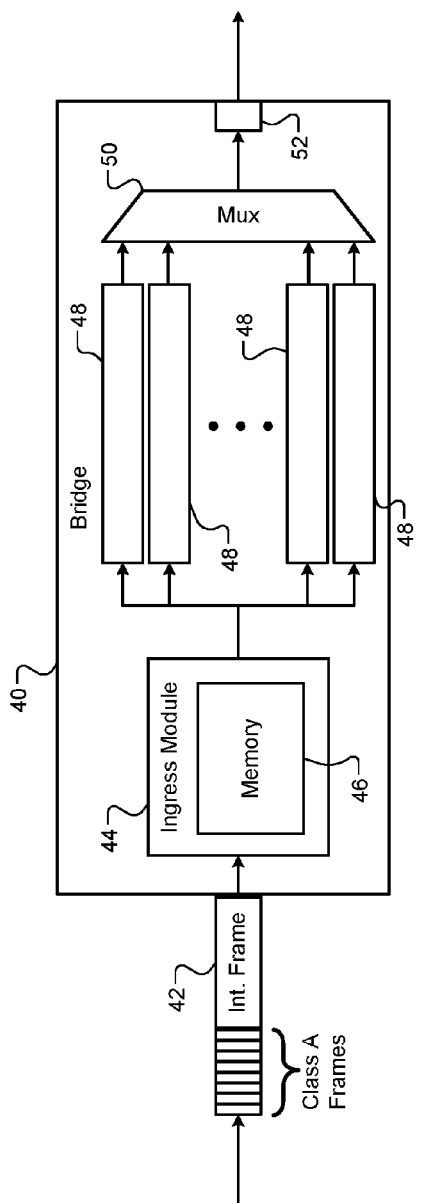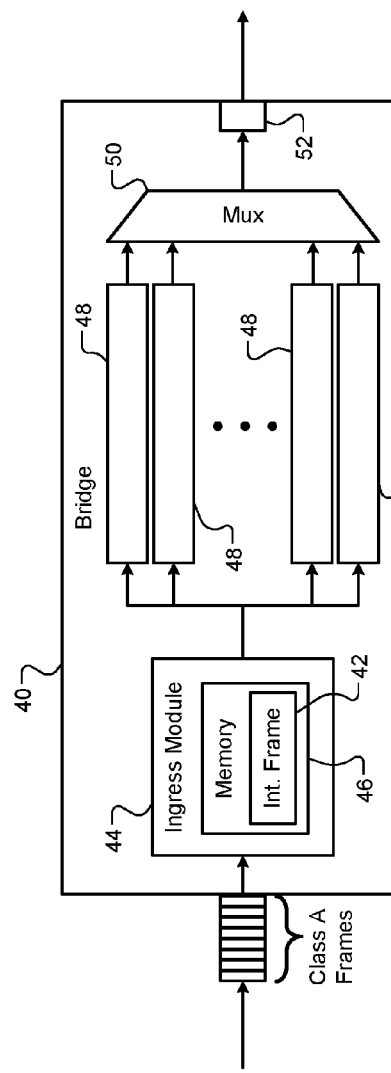

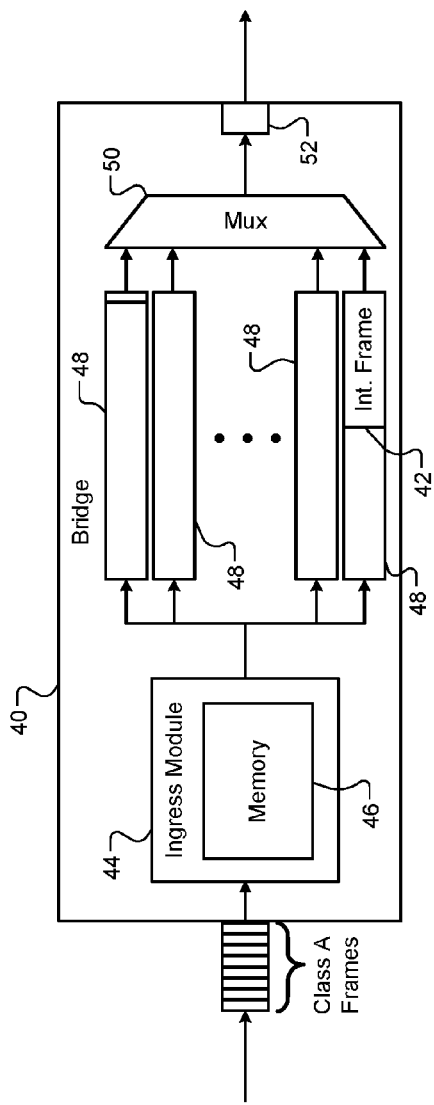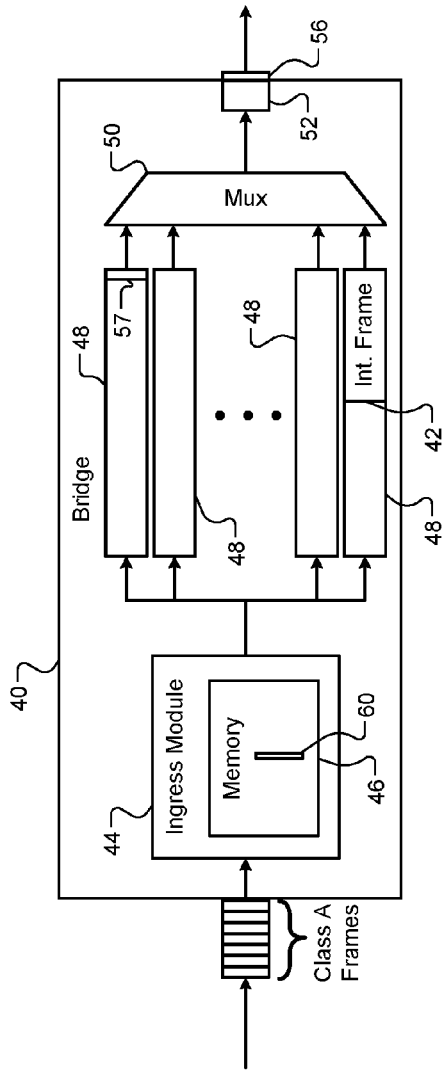

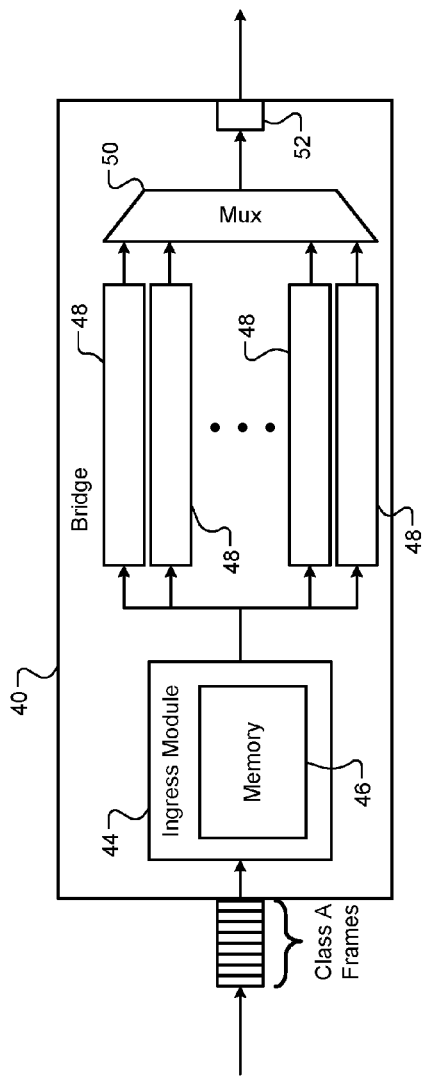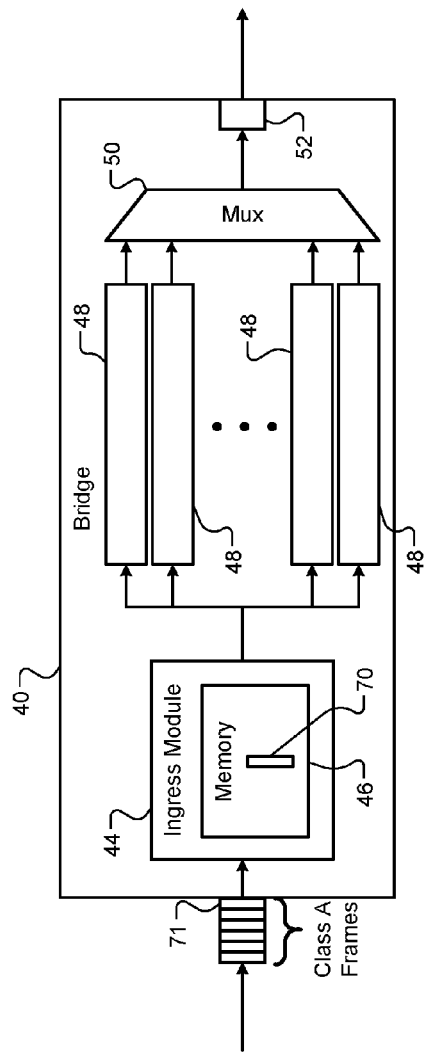

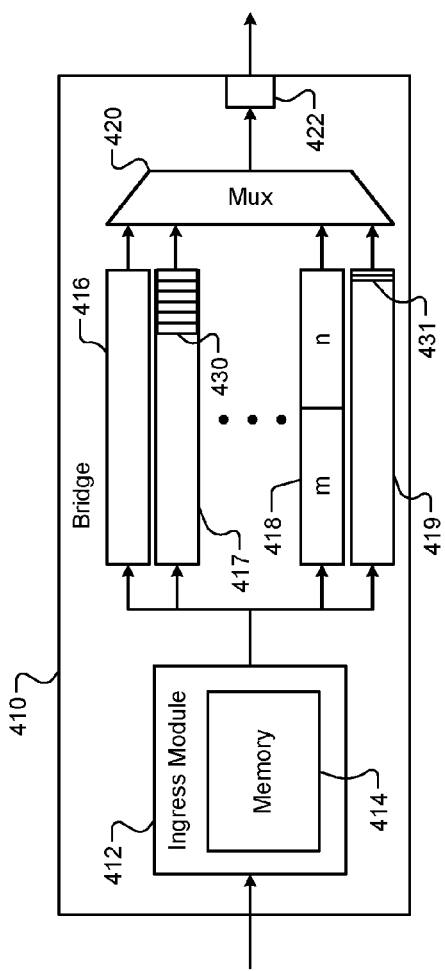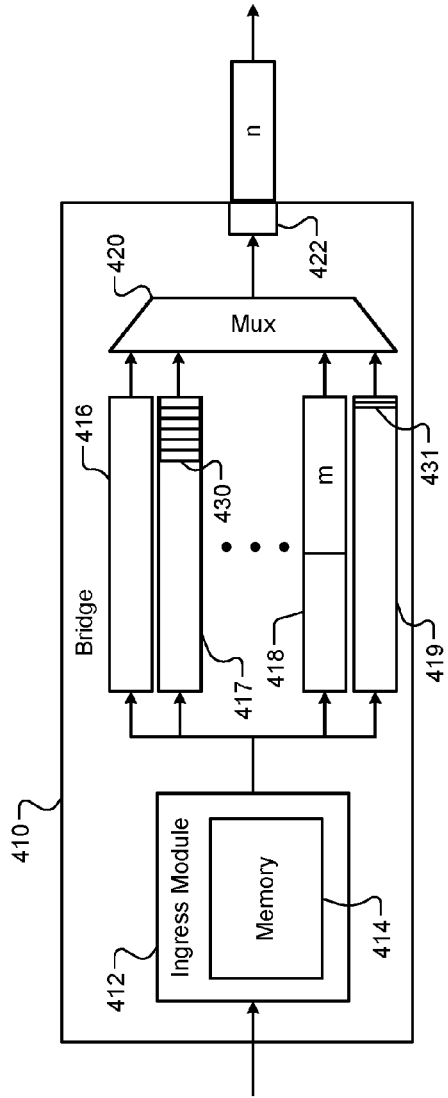

METHOD AND APPARATUS FOR BLOCKING TRANSMISSION OF FRAMES FROM A NETWORK DEVICE

CROSS-REFERENCE TO RELATED APPLICATIONS

The present disclosure is a continuation of U.S. patent application Ser. No. 14/658,747 (now U.S. Pat. No. 9,246, 835), filed on Mar. 16, 2015, which is a continuation of U.S. patent application Ser. No. 13/415,112 (now U.S. Pat. No. 8,982,896), filed Mar. 8, 2012, which claims the benefit of U.S. Provisional Application No. 61/451,525, filed on Mar. 10, 2011, U.S. Provisional Application No. 61/452,482, filed on Mar. 14, 2011, and U.S. Provisional Application No. 61/552,648, filed on Oct. 28, 2011. The disclosures of the above applications are incorporated herein by reference in their entirety.

FIELD

The present disclosure relates to networks, and more particularly to latency of data sources and bridges in a non-arbitrary network.

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

A data communication network may include multiple talkers (or sources of data) and multiple receivers. Any number of bridges may be connected in a daisy chain between each of the talkers and the receivers. The data communication network may be an arbitrary network (referred to as a non-engineered network) or non-arbitrary network (referred to as an engineered network). An arbitrary network may be, for example, a residential local area network (LAN), which may have different network devices (e.g., computers, cellular phones, televisions, printers, and electronic tablets) arbitrarily connecting and disconnecting at various points in the network and at random times. The network devices may connect and disconnect at any time regardless of the priority levels of data being transmitted in the arbitrary network.

A non-arbitrary network may be, for example, an automotive network within a vehicle or a manufacturing assembly line network. In general, network devices in a non-arbitrary network are fixed and are not being connected and/or disconnected from the non-arbitrary network. Although network devices may be connected to and/or disconnected from a non-arbitrary network, communication with a network device that is being connected to or disconnected from the non-arbitrary network is prevented during transmission periods of high-priority data. During these transmission periods, high-priority data is transmitted between network devices in the non-arbitrary network.

For example, a non-arbitrary Ethernet network that is operating according to Institute of Electrical and Electronics Engineers (IEEE) 802.1 Qav may include a talker (or source), multiple bridges and a listener (or receiver). The talker may transmit high-priority data to the listener over the bridges during allocated transmission periods of periodic transmission time intervals. High-priority data may refer to, for example, Class A or Class B data with low-latency requirements. The term latency refers to time for a high-priority frame to be transmitted through one or more hops of the non-arbitrary network. The latency of a single hop is measured from a time when a last bit of a high-priority frame is received by a network device for that hop to a time when the last bit is transmitted from the network device. Simply stated, the latency of a single hop is measured from the last bit into the network device to the last bit out of the network device. A single hop may refer to a talker (referred to as an end station) or a bridge of the non-arbitrary network.

In a non-arbitrary network, transmitted data may have, for example, one of three priority levels. Class A data may include audio video bridging (AVB) data with a highest priority level. Although AVB data may include audio data and/or video data, AVB data may also include control data, user data, reference data, or other types of data. The highest priority level data may be provided with a predetermined amount of bandwidth and a predetermined maximum latency. This assures that the Class A data is transmitted during allocated time periods and latency associated with transmitting the Class A data over a predetermined number of hop(s) and/or between end stations is less than the predetermined maximum latency. Class B data may be AVB data with a next highest priority level. Non-AVB data may have a lowest priority level. In general, higher priority data is transmitted before lower priority data.

If a network device attempts to connect to the non-arbitrary network during the allocated transmission periods, a connection with the non-arbitrary network may be denied. The connection may be established during periods when there is no data transmission activity and/or when data transfers with priority levels of Class B or lower is transmitted.

Fast Ethernet (FE) refers to transmitting data at 100 mega-bits per second (Mbits/s). Gigabyte Ethernet (GE) refers to transmitting one giga-bit per second (Gbits/s). According to IEEE 802.1 AVB standards for a generation 1 Ethernet network (at FE or GE transmission speeds), a Class A frame of data is to pass through seven hops in less than 2 milli-seconds (ms) and a Class B frame of data is to pass through seven hops in less than 50 ms. Although Class A frames and Class B frames may be transmitted over wired or wireless connections, current non-arbitrary networks are not capable of satisfying generation 1 Class A requirements for data transmitted over wireless connections. Time to transmit data over wireless connections is longer than time to transmit data over wired connections.

According to IEEE 802.1 AVB goal 1 for a generation 2 network a Class A frame is to pass through 32 GE transmission speed hops in less than 125 µs. Another AVB goal 2 for a generation 2 network, requires a Class A frame to pass through 5 FE transmission speed hops in less than or equal to 100 µs. Current non-arbitrary networks are capable of satisfying the $2^{nd}$ generation 2 latency goal when transmitting at GE speeds over wired connections. Current non-arbitrary networks are not capable of satisfying generation 2 latency goal 2 when transmitting at FE speeds over wired connections nor are they capable of satisfying generation 2 latency goal 1 when transmitting at GE speeds over wired connections.

SUMMARY

A network device is provided and includes a memory with queues. The queues include a first queue and a second queue.

A timing module is configured to generate at least one of a first priority timing signal or a second priority timing signal. The first priority timing signal and the second priority timing signal are generated based on a clock signal. The clock signal is shared between the network device and other network devices in a non-arbitrary network.

The network device further includes at least one of a deblocking shaper or a blocking shaper. The deblocking shaper is configured to (i) forward first protected data from the first queue, and (ii) generate a deblocking signal based on a first frame signal and the first priority timing signal. The first frame signal indicates a first frame is in the first queue. The blocking shaper is configured to (i) forward one of second protected data and unprotected data from the second queue, and (ii) generate a first blocking signal based on a second frame signal and the second priority timing signal. The second frame signal indicates a second frame is in the second queue. A selector module is configured to generate a select signal to select the first frame or the second frame based on the deblocking signal and the first blocking signal.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF DRAWINGS

The present disclosure will become more fully understood from the detailed description and the accompanying drawings, wherein:

FIGS. 2A-H are functional block diagrams of a bridge illustrating progressions of an interference frame and Class A frames through the bridge;

FIGS. 3A-E are functional block diagrams of a bridge illustrating progressions of Class A frames through the bridge;

FIGS. 16A-E are functional block diagrams of a bridge illustrating frame size-based data progression through a bridge in accordance with the present disclosure;

DESCRIPTION

Figure 1:
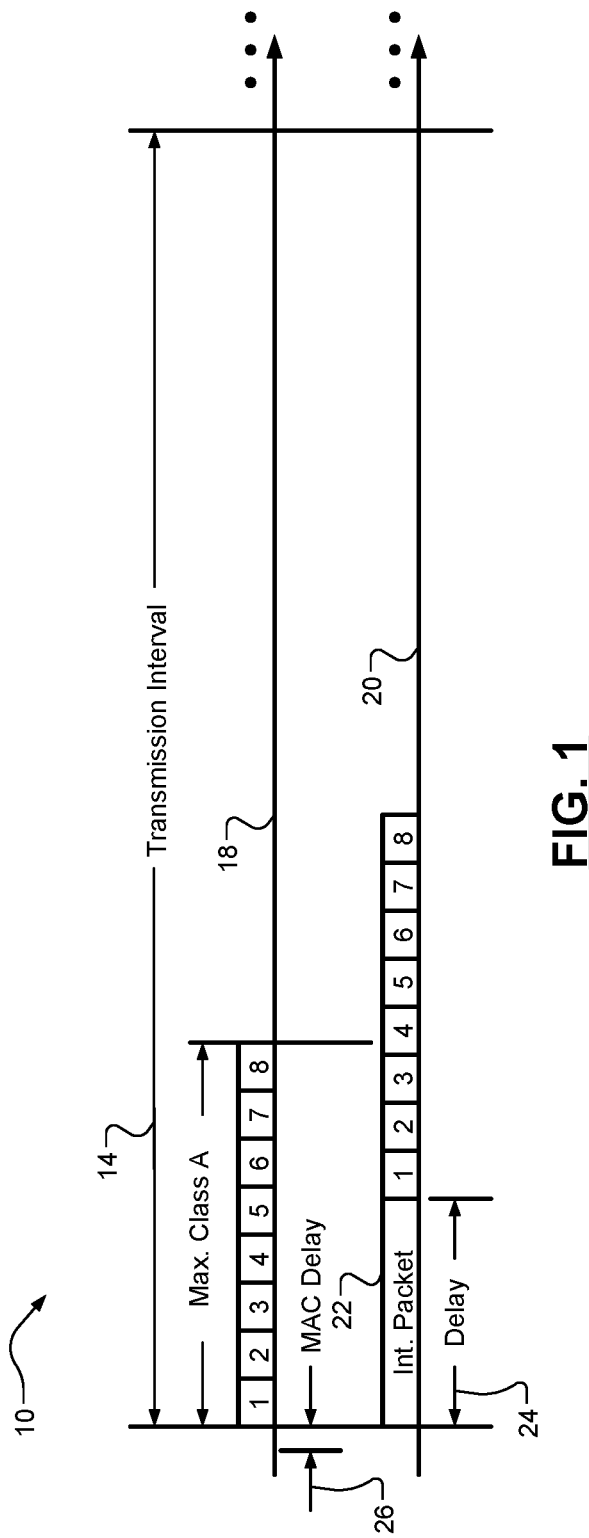
FIG. 1 is a timing diagram illustrating frame transmission timing with and without congestion.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. For purposes of clarity, the same reference numbers will be used in the drawings to identify similar elements. As used herein, the phrase at least one of A, B, and C should be construed to mean a logical (A or B or C), using a non-exclusive logical OR. It should be understood that one or more steps within a method may be executed in different order (or concurrently) without altering the principles of the present disclosure.

As used herein, the term module may refer to, be part of, or include an Application Specific Integrated Circuit (ASIC); an electronic circuit; a combinational logic circuit; a field programmable gate array (FPGA); a processor (shared, dedicated, or group) that executes code; other suitable hardware components that provide the described functionality; or a combination of some or all of the above, such as in a system-on-chip. The term module may include memory (shared, dedicated, or group) that stores code executed by the processor.

The term code, as used above, may include software, firmware, and/or microcode, and may refer to programs, routines, functions, classes, and/or objects. The term shared, as used above, means that some or all code from multiple modules may be executed using a single (shared) processor. In addition, some or all code from multiple modules may be stored by a single (shared) memory. The term group, as used above, means that some or all code from a single module may be executed using a group of processors. In addition, some or all code from a single module may be stored using a group of memories.

In addition, in the following description various variable labels and values are disclosed. The variable labels and values are provided as examples only. The variable labels are arbitrarily provided and may each be used to identify or refer to different items. For example, the variable label n may be used to refer to a number of frames or queues. The values are also arbitrarily provided and may vary per application.

Furthermore, in the following description terms, such as "first", "second", and "third" are used. These terms are not specific to any one device, signal, etc. More than one of the terms may be used to refer to the same device, signal, etc. depending upon the context.

Gigabyte Ethernet (GE) Network

A GE network may have a minimum frame size of 64 bytes with a transmission latency time of 0.512 μs per hop. An average (or normal) size Ethernet frame may have 300 bytes and a maximum frame size may be 1522 bytes. An Ethernet frame that is 300 bytes may have an associated 320 bytes worth of transmission time, where 20 bytes of time is associated with an Ethernet preamble (repeating pattern of 1s and 0s and/or a start of frame delimiter) and an interframe gap (IFG). The IFG refers to a gap of time between sequential frames of data. Latency associated with transmitting the 320 bytes from a talker is 2.56 µs. Transmission line delay between network stations (or nodes) when data is transmitted on, for example, CAT 5e cable is approximately 538 nano-seconds (ns) for 100 meters (m) of cable.

In FIG. 1, a timing diagram 10 is shown illustrating frame transmission timing with and without congestion. Blocks of data 1-8 that are transmitted between network devices are shown and may each include a frame of data (referred to hereinafter as a frame). Each of the frames may have 300 bytes. The frames may be transmitted using FE speeds. The frames are transmitted in a periodic transmission timing interval 14. The periodic transmission timing interval 14 may have a length of, for example, 125 µs for an 8 kilo-hertz (kHz) signal. The frames may include Class A data. Class A data may refer to data with a highest priority level for GE. Class A data may be transmitted during each periodic transmission time interval. The blocks of data 1-8 are shown with no congestion (i.e. no interfering frame) and with congestion (i.e. with an interfering frame). A maximum number of frames that may be transmitted during each of the periodic transmission time intervals may be, for example, eight.

A first time line 18 has the blocks of data 1-8 without an interfering frame. Each of the blocks of data 1-8 may include a Class A frame (e.g., 300 bytes), a preamble, and an interframe gap (IFG). The preamble and IFG may have an associated 20 bytes of time. A second time line 20 has the blocks of data 1-8 with an interfering frame block 22. The interfering frame block 22 may include an interfering frame, a preamble and an IFG. An interfering frame refers to a frame that is ready to be transmitted prior to and/or when a Class A frame is ready to be transmitted and as a result delays transmission of the Class A frame. The interfering frame may be a maximum size GE frame with, for example, 1522 bytes of data. The preamble and IFG of the interfering frame block 22 may have an associated 20 bytes of time. Due to the interfering frame block 22, the blocks of data 1-8 and corresponding Class A frames are delayed by a delay period 24. The smaller the sizes of the Class A frames and the interfering frame the less latency associated with transmitting the Class A frames. Transmission of the eight frames may also be delayed due to delay of a media access controller (MAC), as shown by MAC delay 26.

Figure 10:
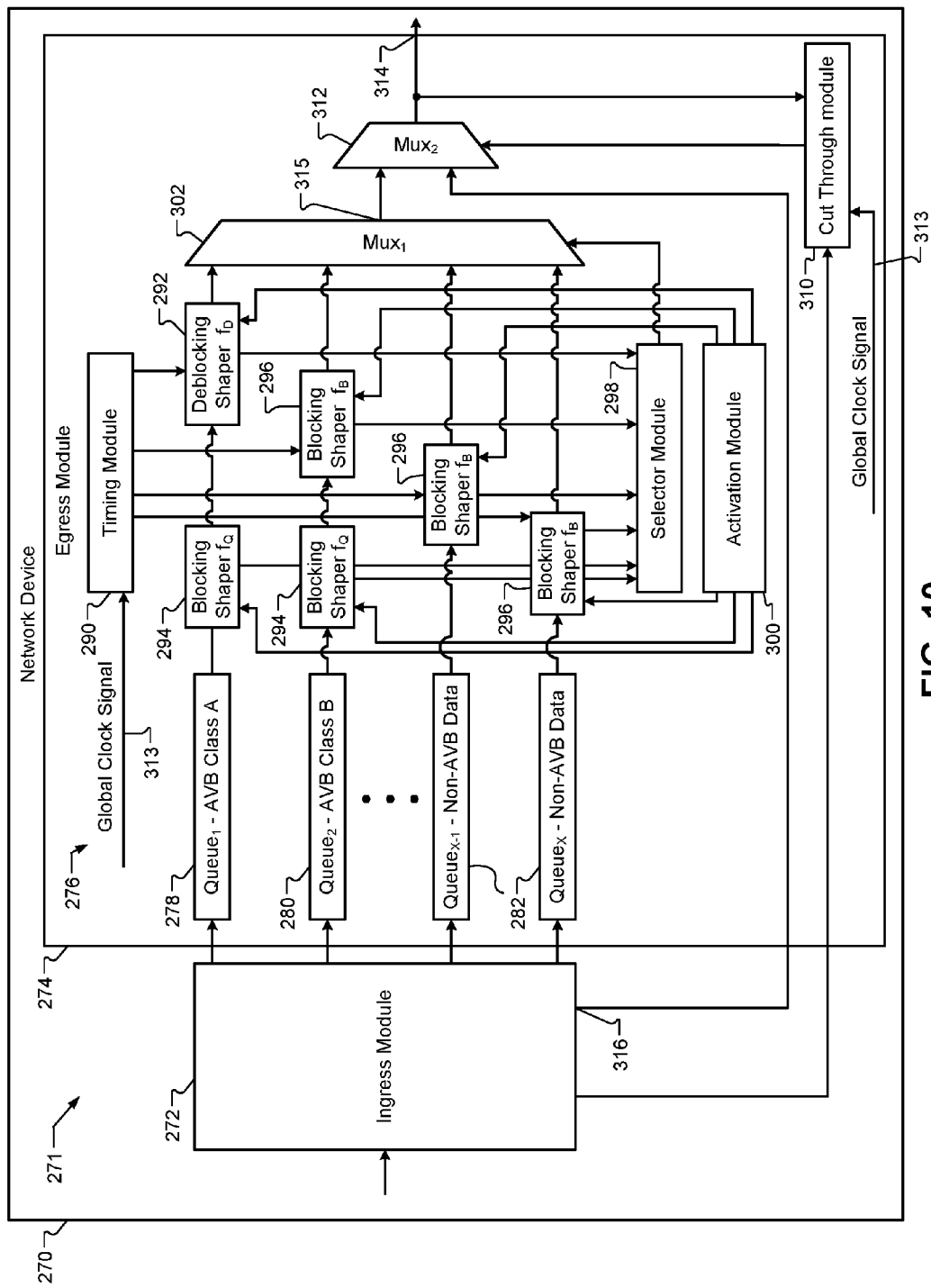
FIG. 10 is a functional block diagram of a network device in accordance with the present disclosure.
Figure 11:
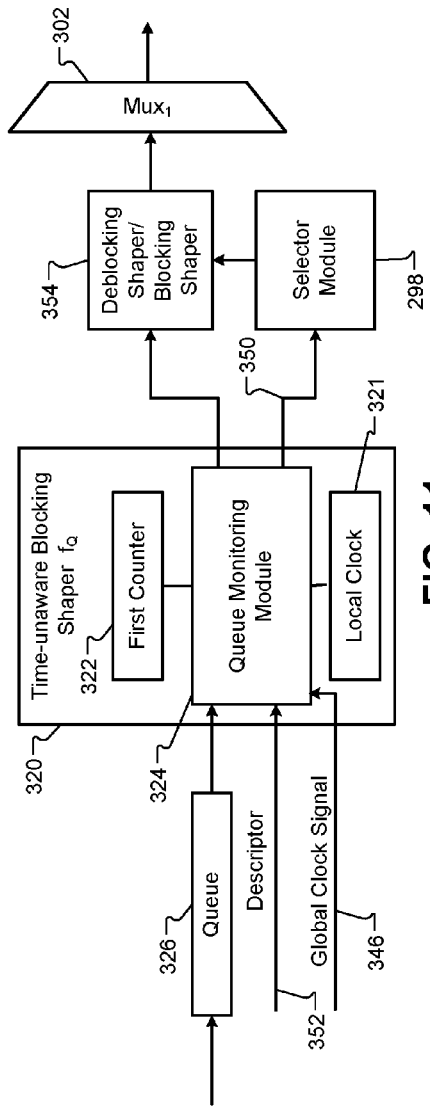
FIG. 11 is a functional block diagram of a time-unaware blocking shaper in accordance with the present disclosure.

The IFG of the Class A frames may be provided by a time-unaware blocking shaper. The time-unaware blocking shaper spreads out frames over a periodic transmission time interval. In spreading out the frames, interframe gaps (periods without data) are provided between sequential frames. Examples of blocking shapers are shown in FIGS. 7-11 and 13-15. A time-unaware blocking shaper refers to a blocking shaper that does not operate based on a grand master clock. A grand master clock is a clock that generates a global clock signal, which is shared by network devices in a non-arbitrary network. Examples of a time-unaware blocking shaper are shown in FIGS. 10 and 11. Transmissions performed based on a grand master clock are further described in more detail below with respect to FIGS. 7 and 10.

A talker may burst data based on a number of Class A frames to be transmitted during the periodic transmission time interval. The time-unaware blocking shaper for the Class A data may be disabled to prevent the Class A data from being spread out over a periodic transmission time interval. This can minimize delays associated with interfering frames, as there is not an IFG in which transmission of an interfering frame may be initiated.

Example Latency for Type I Transmission

Data transmission with congestion and without use of a blocking shaper is referred to as type I data transmission. A simple network may include a talker, N number of 2 port bridges (a bridge having a single input port and a single output port), and a listener. Times for a control frame to pass through one of the bridges and from a talker to a listener are described with respect to the following FIGS. 2A-2H. FIGS. 2A-H illustrate data progressions through a bridge 40 with congestion and without use of blocking shapers. Progressions of an interference frame 42 and Class A frames through the bridge 40 are shown. The Class A frames are transmitted sequentially without use of blocking shapers. The interference frame 42 is a maximum size interference frame that is transmitted prior to transmission of the Class A frames.

The bridge 40 includes an ingress module 44 with memory 46, queues 48, a multiplexer 50, and an output port 52. The following bridge latency values may be measured from an ingress time reference plane or start of latency per IEEE 1722.

In FIG. 2A, the interference frame 42 is shown as arriving at the bridge 40 followed by the Class A frames. A first bit of the interference frame 42 is received by the bridge 40 from an upstream network device (e.g., a talker or bridge) at time $t_0$. In FIG. 2B, the interference frame 42 is shown as being received and stored in the memory 46. After the interference frame 42 is received, a first bit of a first one of the Class A frames is received. This occurs at t=12.336 µs, as the interference frame has 1542 associated bytes of latency time. The interference frame 42 may have, for example, 1522 bytes and 20 bytes of time associated with a preamble and an IFG. In FIG. 2C, the interference frame 42 is shown as being transferred from the memory 46 into one of the queues 48 associated with low-priority data and/or non-AVB data. At t=13.360 µs, 128 bytes of the first control frame is received, which is equal to the time to receive the interference frame 42 of 12.336 µs plus the time to process the 128 bytes or 1.024 µs. Two slot times (or clock cycles of the bridge 40) after the first bit of the first Class A frame is received, a first bit of the interference frame 42 is transmitted out of the bridge 40, as shown in FIG. 2D. The first Class A frame 57 may then be stored in a first one of the queue 48.

Figure 2E:
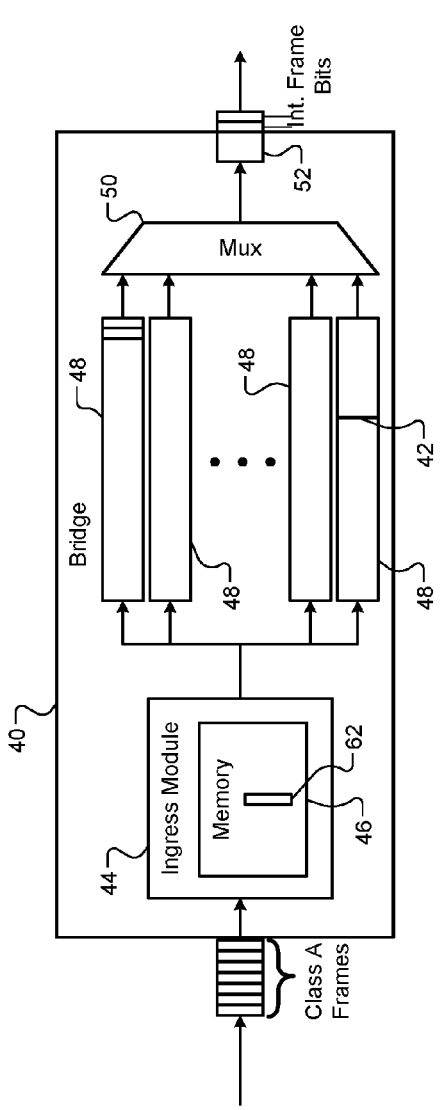

In FIG. 2D, a first bit 60 of a second Class A frame is shown as being received by the bridge 40. This occurs at t=14.896 µs, which is equal to the time to receive the interference frame 42 of 12.336 µs plus the 320 bytes of time associated with the first Class A frame. In FIG. 2E, a first bit 62 of a third Class A frame is shown as being received. This may occur at t=17.456 µs, which is equal to the time to receive the interference frame 12.336 µs plus twice the 320 bytes of time associated with a Class A frame.

Figure 2F:
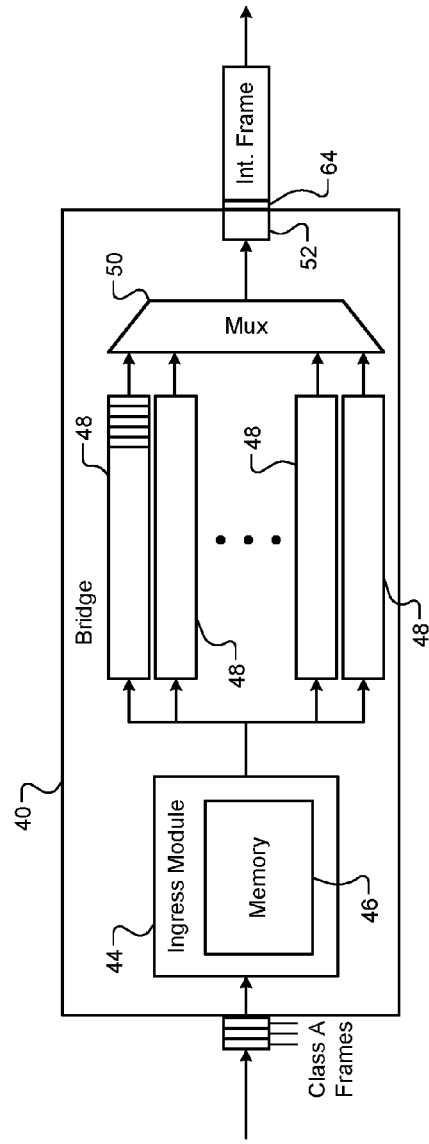

In FIG. 2F, the first bit 64 of the first Class A frame is shown as being transmitted from the bridge 40. This may occur at t=25.696 µs, which is equal to the time to receive the interference frame (or start time) of 12.336 µs plus time to process five Class A frames and 70 bytes of a sixth Class A frame (or transmit time of the interference frame) of 13.360 µs. The process time of the five Class A frames and the 70 bytes of the sixth Class A frame is equal to the start time of the first Class A frame.

Figure 2G:
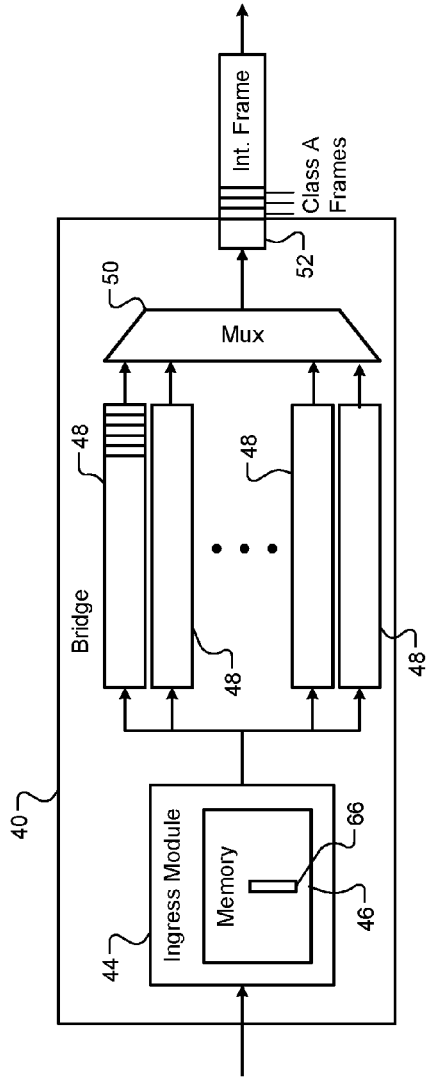
Figure 2H:
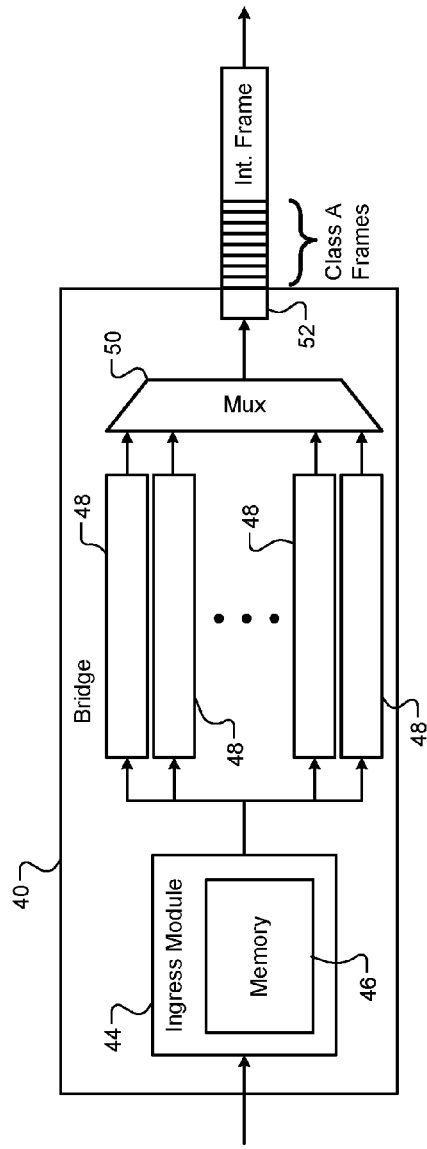

In FIG. 2G, a last bit 66 of the Class A frames is received by the bridge 40. This may occur at t=32.656 µs and includes processing time of the remainder of the sixth frame and processing times of the seventh and eighth frames. In FIG. 2H, the last bit of the Class A frames is transmitted from the bridge 40. This may occur at t=46.016 µs, which is equal to the start time 13.36 µs plus the transmit time of the interference frame and the Class A frames of 32.656 µs. The time t of 46.016 µs is first bit into the bridge 40 to last bit out of the bridge 40 (referred to as first bit in to last bit out time). To eliminate double counting of talker transmit time, which is equal to a receive time of the bridge 40, last bit into the bridge 40 to last bit out of the bridge 40 (referred to as last bit in to last bit out time) is considered rather than the first bit in to last bit out time.

The last bit in to last bit out time is equal to the time t of 46.016 µs minus the transmit time of the interference frame of 12.226 µs minus the transmit time of the eight Class A frames of 20.48 µs plus 20 bytes of preamble and IFG time, which is equal to 13.36 µs. The last bit in to last bit out time may also be determined by subtracting the last Class A bit out time from the last Class A bit in time, which is also equal to 13.36 µs.

Maximum latency of the bridge 40 for the Class A frames is equal to delay time $t_{bridge}$ of the bridge 40 plus time $t_{MAXINT}$ to receive the maximum size interference frame plus transmission time $t_{Cable}$ of cable(s) between the bridge 40 and, for example, another network device. The transmission time $t_{Cable}$ of cable(s) may be determined for a 100 m cable.

A maximum latency to transmit the eight 300 byte Class A frames on GE over a daisy chain of 5 network devices (1 talker and 4 bridges) may be determined as follows. With a bridge delay of two slot times and a maximum non-AVB data size of 1522 bytes, the maximum latency is equal to 1.024 µs ($t_{bridge}$) plus 12.336 µs ($t_{MAXINT}$) plus 0.538 µs ($t_{Cable}$) or 13.898 µs. This is equal to the last bit in to last bit out time 13.36 µs plus the cable delay time of 0.538 µs.

Example Latency for Type II Transmission

Figure 3C:
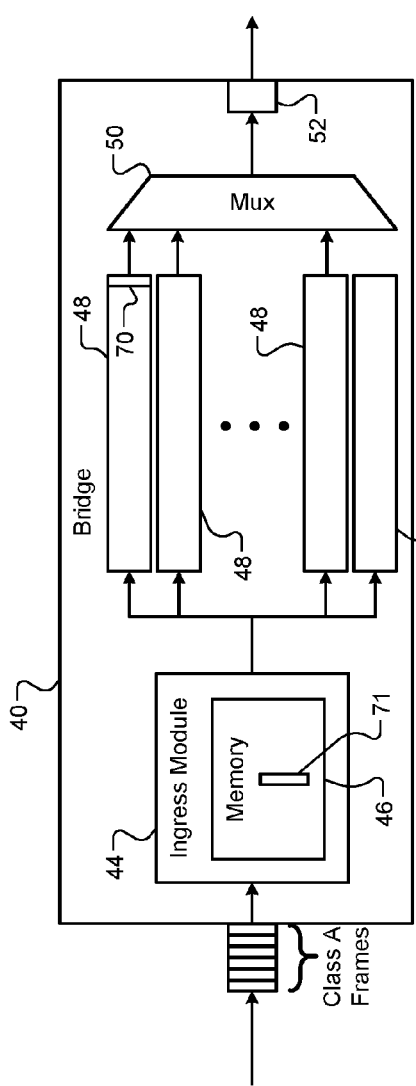

FIGS. 3A-E illustrate progressions of Class A frames through the bridge 40 without congestion and without blocking shapers. Data transmission without congestion and without blocking shapers may be referred to as type II data transmission. The bridge 40 includes the ingress module 44 with the memory 46, the queues 48, the multiplexer 50 and the output port 52. In FIG. 3A, eight Class A frames are shown as arriving at the bridge 40. A first bit of the first Class A frame is received by the bridge 40. This is at time $t_0$. In FIG. 3B, a first frame 70 of the first Class A frame has been received and a first bit of the second Class A frame being received by the bridge 40. The first bit of the second Class A frame 71 may be received, for example, 320 bytes of time after receiving the first bit of the first Class A frame. This may occur at time t equal to 2.56 µs.

Figure 3D:
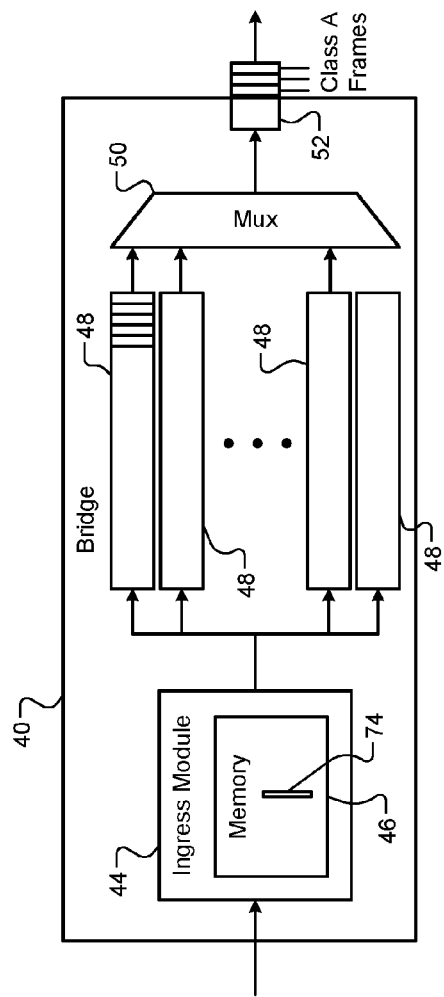

In FIG. 3C, the first Class A frame 70 is shown as being stored in a first queue. The first bit of the first Class A frame 70 may be transmitted from the bridge 40. This may occur two slot times after receiving the first bit of the second Class A frame 71 or at time t equal to 3.584 µs. At this time 128 bytes of the second Class A frame 71 are stored in the bridge 40. In FIG. 3D, a last bit 74 of the last Class A frame is shown as being received by the bridge 40. This may occur at time t equal to 20.32 µs, which is equal to the previous time of 3.584 µs plus receive time of the remaining frames or 16.736 µs.

Figure 3E:
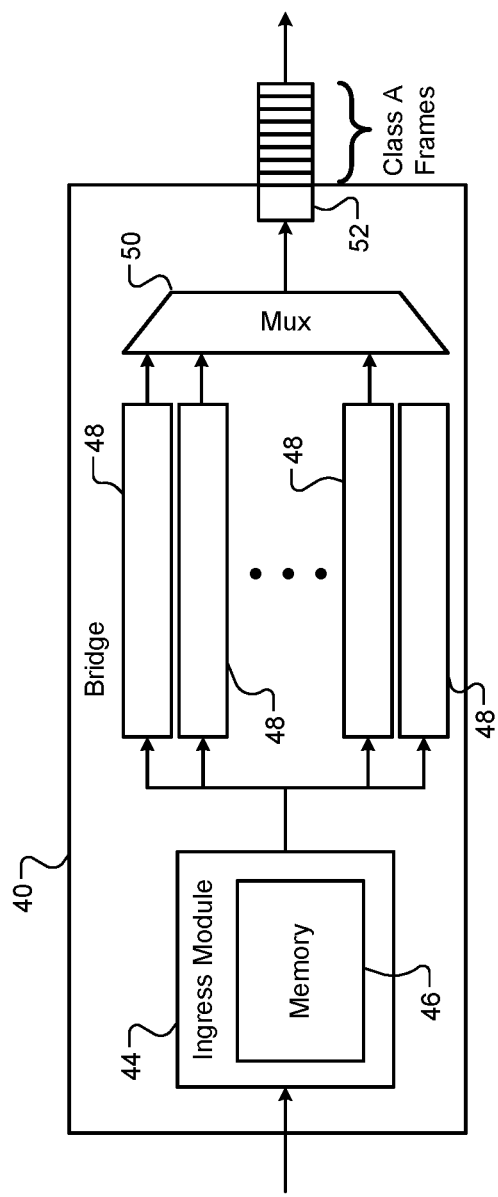

In FIG. 3E, the last bit of the last Class A frame is shown as being transmitted from the bridge 40. This may occur at time t equal to 23.904 µs, which is equal to time delay associated with the first Class A frame of 3.584 µs plus the transmit time of the Class A frames from the talker to the bridge 40 of 20.32 µs. The 23.904 µs is the first bit in to last bit out time of the bridge 40. The last bit in to last bit out time may be determined by subtracting the transmit time of 20.48 µs from the first bit in to last bit out time of 23.904 µs, which is equal to 3.584 µs. The last bit in to last bit out time is also equal to the time that the last bit of the last Class A frame was received minus the time that the last bit of the last Class A frame was transmitted from the bridge 40.

Maximum latency of the bridge 40 for the type II transmission may be determined as the delay time $t_{Bridge}$ of the bridge 40 plus the time $t_{MAXFrame}$ to receive a maximum size Class A frame plus the cable delay time $t_{Cable}$. With a bridge delay of two slot times and a maximum Class A frame size of 300 bytes, the maximum latency is equal to 1.024 µs ($t_{Bridge}$) plus 2.56 µs ($t_{MAXFrame}$) plus 0.538 µs ($t_{Cable}$) or 4.122 µs. The maximum latency is equal to the last bit in to last bit out time 3.584 µs plus the cable delay time of 0.538 µs.

Based on the maximum latency times associated with FIGS. 2A-3F, latency associated with congestion is worse than latency when there is not congestion. In a non-arbitrary network, transmission can be performed without congestion.

Example GE Margin Determination for Type II Transmission

As an example, a GE control frame may have 256 payload bytes, where 32 of the control frames may be transmitted every 500 µs. Each of the control frames may have 22 bytes of overhead and have a 20 byte IFG. The delay time associated with transmitting from a talker each of the control frames is equal to 2.384 µs (or 298 bytes*8 bits*1 ns) with no congestion. The delay time associated with transmitting a control frame without a preamble or IFG from a talker is 2.224 µs (or 278 bytes*8 bits*1 ns) with no congestion. Time to transmit the 32 frames from a talker is 76.288 µs (or 2.384 µs*32) with no congestion. Without the IFG, the latency is 72.8 µs. For this reason, latency of GE passes the AVB generation 2 requirement of transmitting 32 frames from a talker in less than or equal to 100 µs. A network transmitting data using GE may pass the 100 µs requirement with congestion.

Time to transmit one of the control frames (278 bytes) or 2.224 µs plus time for a bridge to process the control frame (e.g., 1.024 µs, which is equal to two 512 bit times) provides a latency time for one hop of 3.248 µs. For four bridge hops the latency time is 12.992 µs. As a result, total transmission time including time to transmit the control frame from the talker and time for four bridges to process the control frame without congestion is 15.216 µs. For this reason, latency of GE passes the AVB generation 2 requirement of transmitting a control frame over five hops in less than or equal to 100 µs with greater than 84 µs of margin (time left over). The 84 µs of margin for GE may be used to transmit other frames of data within the periodic transmission time interval. This transmission is without an interfering frame and is based on coordinated transmission of the control frame into an egress module of the talker and out of the talker. Without coordinated transmission timing, the margin is reduced.

A maximum latency of a talker for AVB generation 2 is calculated by summing an internal delay time of a media access controller of the talker $t_{MAC}$, time to transmit a maximum size interfering frame $t_{MAX}$, time to transmit Class A data $t_A$, and time to transmit bits down a 100 meter cable $t_{cable}$. Assuming eight 300 byte Class A frames are transmitted, each frame having a 20 byte preamble and IFG, and a MAC delay being equal to 1522 bytes, the maximum latency for the talker is 33.866 μs, where $t_{MAC}$=0.512 μs, $t_{MAX}$=12.336 μs, $t_A$=20.48 μs, and $t_{cable}$=0.538 μs. The maximum latency of 33.866 μs is the total time to transfer the last bit of the last frame from the talker to a network device or node (e.g., a bridge or receiver) downstream from the talker. The maximum latency is calculated without use of a shaper (i.e. no IFG and the control frames are not spread out over a periodic transmission time interval).

Example FE Margin Determination for Type II Transmission

Figure 5:
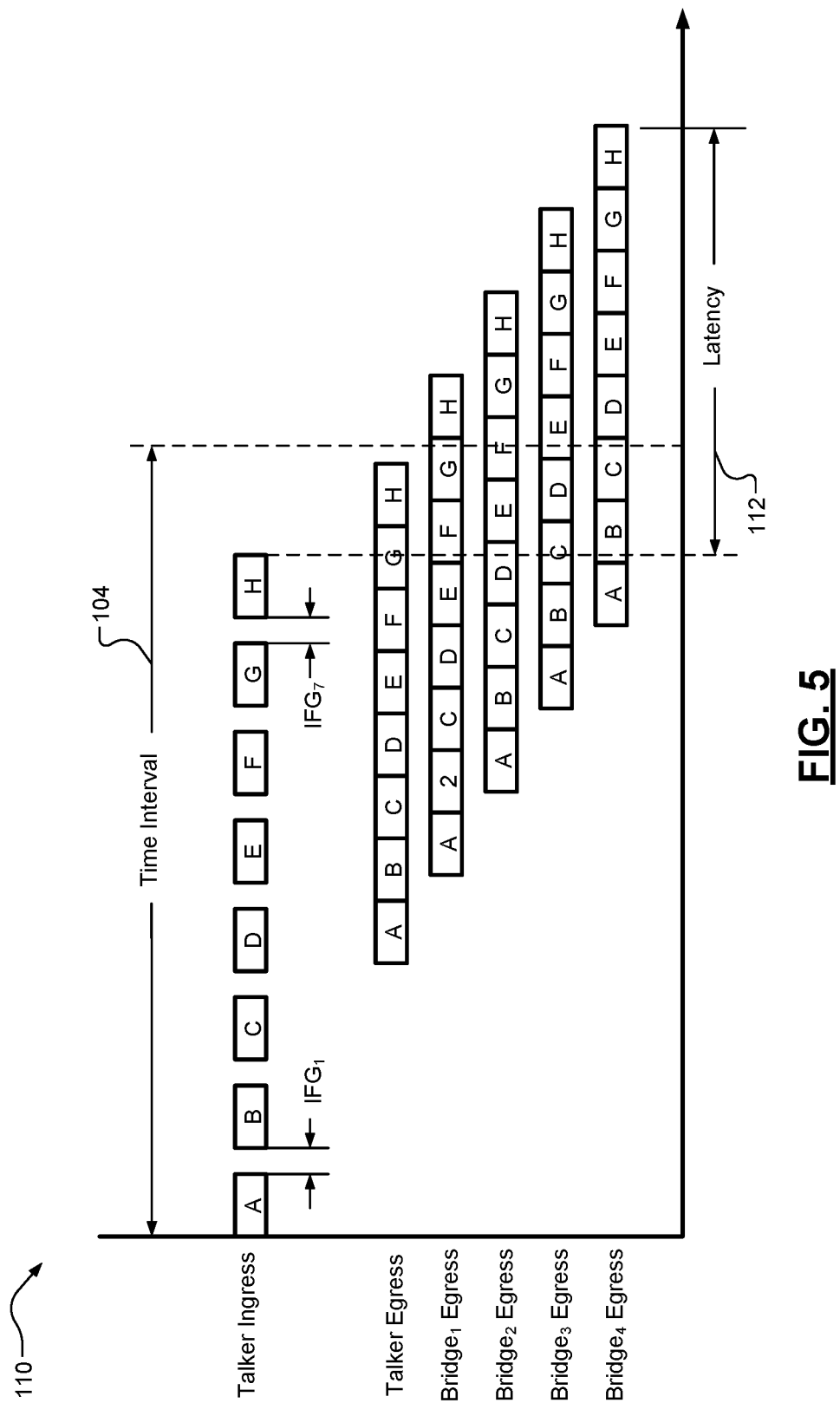
FIG. 5 is a timing diagram illustrating latency associated with coordinated transmission of frames.

As an example, a FE control frame may have 128 bytes of data. Eight control frames may be transmitted every periodic transmission time interval of, for example, 500 μs. Each of the control frames may be transmitted with 20 bytes of preamble and/or IFG time. Time to transmit a control frame may then be equal to 13.6 μs (or 170 bytes*8 bits*10 ns). Latency for the eight frames is equal to 1360 bytes of time (or 170 bytes*8 frames). As a result, time to transmit the eight frames is 108.8 μs (or 13.6 μs*8 frames). The time to transmit the eight frames is greater than the required 100 μs. For FE AVB generation 2 transmission, latency is required to be less than or equal to 100 μs for 5 hops. For this reason, the coordinated transmission of frames as shown in FIG. 5 (and explained more below) is performed. With this adjustment the latency over the 5 hops is 100 uSec if there is no congestion at any of the hops. Thus there is zero margin left over to transmit other frames of data that may cause congestion within the periodic transmission time interval when using FE. With one or more bits of interference, time to transmit the eight frames is further increased. As a result, traditional transmission of the eight frames of data using FE does not satisfy latency requirements for AVB generation 2.

Figure 4:
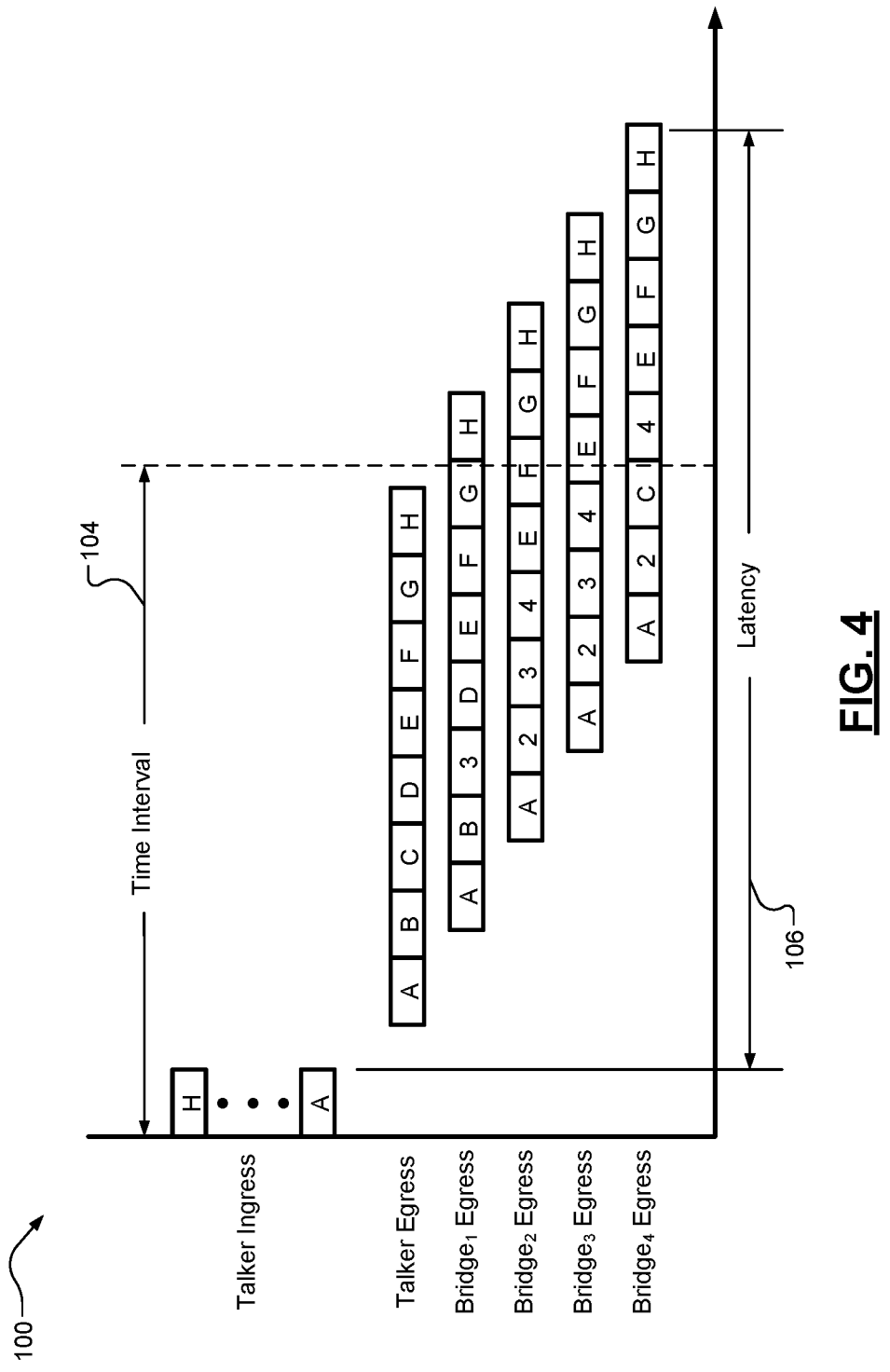
FIG. 4 is a timing diagram illustrating latency associated with receiving frames in parallel.

In the following FIGS. 4 and 5, timing diagrams are provided for a network that includes a talker, 4 bridges, and a listener. Data is transmitted from the talker, passed through the 4 bridges and received at the listener. The bridges are store and forward bridges (i.e. no blocking shapers are used). In FIG. 4, a timing diagram 100 is shown illustrating latency associated with receiving eight frames A-H in parallel (i.e. during the same time period). The eight frames A-H are received and transmitted by the talker within a periodic transmission time interval 104 (e.g., 125 μs). Latency 106 for the network is measured from when the last bit of the eight frames A-H is transmitted from the talker until when a last bit of the eighth frame H is received at the listener. Although the eight frames A-H are received in parallel, the eight frames A-H are transmitted sequentially from the talker and the bridges. Transmission from the talker is identified as talker egress. Transmission from the bridges is identified as bridge egress.

Referring now also to FIG. 5, a timing diagram 110 is shown illustrating latency associated with coordinated transmission. Coordinated transmission refers to transmitting frames sequentially at predetermined time periods with IFGs between each sequential pair of frames. The eight frames A-H are received and transmitted by the talker within the periodic transmission time interval 104 (e.g., 125 μs). As latency 112 is measured when the last bit of the eighth frame H is transmitted from the talker until when the last bit of the eighth frame H is received at the listener, the latency 112 for coordinated transmission is less than the latency 106 for parallel transmission.

Latency for each 128 byte frame is equal to the time for the talker to transmit the frame plus time delays associated with each of the 4 bridges to receive and forward the frame. As an example, the transmit time of the talker may be 150 bytes of time or 12.0 μs (150 bytes*8 bits*10 ns). The 150 bytes of time includes the 128 bytes plus 22 bytes of overhead (e.g., a preamble and an IFG). Time for each bridge to process the frame may be 10.00 μs (approximately two 512 bit times). The latency associated with transmitting the frame from a talker and processing the frame via one of the bridges is 12.0 μs plus 10.00 μs or 22.00 μs. As a result, the latency associated with transmitting the frame from a talker and processing the frame via four bridges is 100.00 μs (12.0 μs plus 4*22.00 μs), which is equal to the 100 μs requirement. With congestion, this latency is longer and no longer satisfies latency requirements. As congestion is a normal aspect of non-time aware systems, a current FE system does not satisfy the latency requirements. The implementations disclosed below control transmissions of a talker and bridges to provide latency for FE that is less than the 100 μs latency requirement.

The below described implementations are directed to non-arbitrary networks (hereinafter referred to as networks). The networks may be, for example, automotive networks, manufacturing facility networks, and/or assembly line networks. The networks may include various network devices such as talkers, bridges, receivers, and time translator devices. Although each network device is labeled as one of a talker, a bridge, a receiver, and a time translator device, each of the network devices may perform as a talker, a bridge, a receiver and/or a time translator device. Interfaces, cables, and/or mediums between the network devices may include controller area network (CAN) and/or FlexRay interfaces and buses, category (CAT) 5 communication cables, or other suitable interfaces, cables and/or mediums.

Data is transmitted over a network between two network devices, referred to as end stations. Although data is described as being transmitted in a single direction from a first network device or first end station (e.g., talker) to a last network device or last end station (e.g., receiver), data transmission may be initiated at any station in the network and may be received at any station in the network. The data may have different corresponding priority levels and may be transmitted based on the priority levels.

The priority levels may include, for example, protected Class A AVB data (referred to as Class A data), protected Class B AVB data (referred to as Class B data), and unprotected non-AVB data. Protected data has a predetermined bandwidth (i.e. allocated time period per periodic transmission time interval), and a predetermined maximum latency (or predetermined maximum latencies). The protected data of a particular priority level may have a predetermined maximum latency per network device in the network and/or a collective predetermined maximum latency between end stations.

The Class A data has the highest priority level, may have the shortest latency, is provided with a first predetermined bandwidth (i.e. first allocated time period per periodic transmission time interval), and first predetermined maximum latencies. Class A data may include control data. As an example, in an automotive application, the Class A data may include data used to control an engine or operate brakes of a vehicle. The Class B data has a second highest priority level, may have a longer latency than the Class A data, is provided with a second predetermined bandwidth, and/or predetermined maximum latencies. As an example, in an automotive application, Class B data may include entertainment system data. The non-AVB data has the lowest priority level, is not provided with a predetermined bandwidth, and/or is not provided with a predetermined maximum latency. In the networks, data may be transmitted as predetermined sized bursts, each burst associated with data for a particular one of the priority levels. The bursts may occur at allocated times during periodic transmission time intervals. As an example, Class A data may be transmitted from an egress module of a network device (a talker, a time translator device, and/or a bridge) for 40 µs during each 125 µs periodic transmission time interval.

Figure 6:
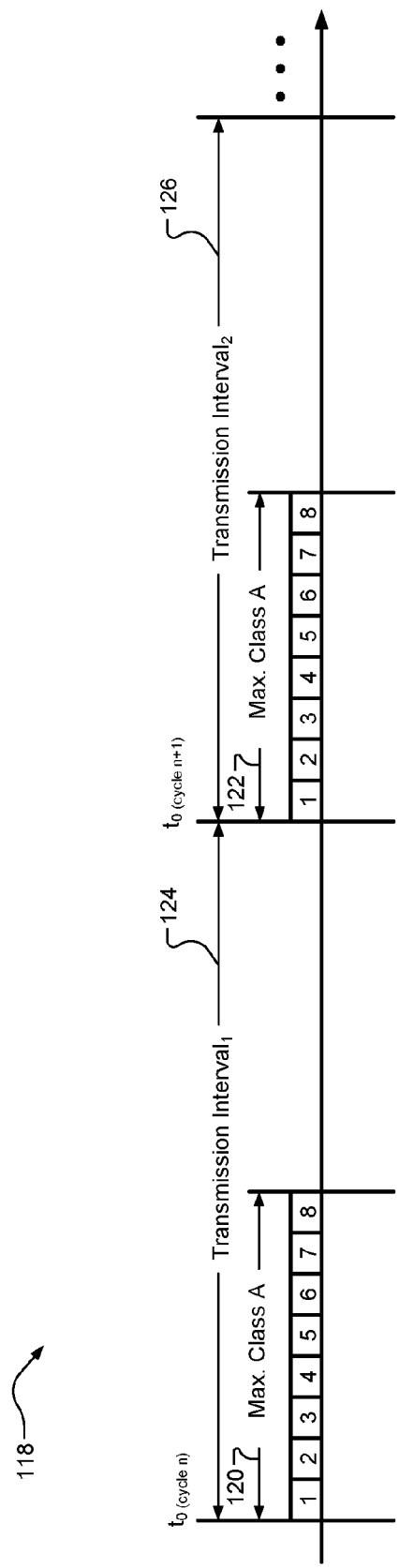
FIG. 6 is a timing diagram illustrating Class A allocated time periods and corresponding periodic transmission time intervals.

In FIG. 6, a timing diagram 118 is shown illustrating Class A allocated time periods or windows and corresponding periodic transmission time intervals. Class A data may be transmitted from a talker within allocated time windows of periodic transmission time intervals. Each allocated time window has a start time $t_0$. In FIG. 6, two example allocated time windows 120, 122 and corresponding periodic transmission time intervals 124, 126 are shown. Each of the periodic transmission time intervals may be referred to as a cycle. The cycles for the two periodic transmission time intervals 124, 126 are labeled n and n+1.

For example only, requirements for FE may include transmission of eight 128 byte frames every 500 µs (periodic transmission time interval). The allocated time window for Class A data (may be referred to as low latency data) within each of the periodic transmission time intervals may be 108.8 µs. For eight frames, this may include: time associated with the 128 bytes of data and 22 bytes of overhead data; and/or 20 bytes of time associated with preamble data and an IFG. A 108.8 µs burst window provides 391.2 µs for other data (may be referred to as non-low latency data).

As another example, requirements for GE may include transmission of thirty-two 256 byte frames every 500 µs. The allocated time window for Class A data within each of the periodic transmission time intervals may be 76.288 µs. For thirty-two frames, this may include: time associated with the 256 bytes of data and 22 bytes of overhead data; and/or 20 bytes of time associated with preamble data and an IFG. A 76.288 µs burst window provides 423.712 µs for other data (e.g., non-low latency data).

To satisfy AVB generation 2 requirements, the Class A data is to be transmitted over 5 hops with less than or equal to 100 µs of delay for both FE and GE. Although FE and GE are disclosed herein, the implementations disclosed herein may apply to other transmission speeds. Also, although the implementations are primarily described with respect to Ethernet networks, the implementations may be applied to other networks.

Figure 7:
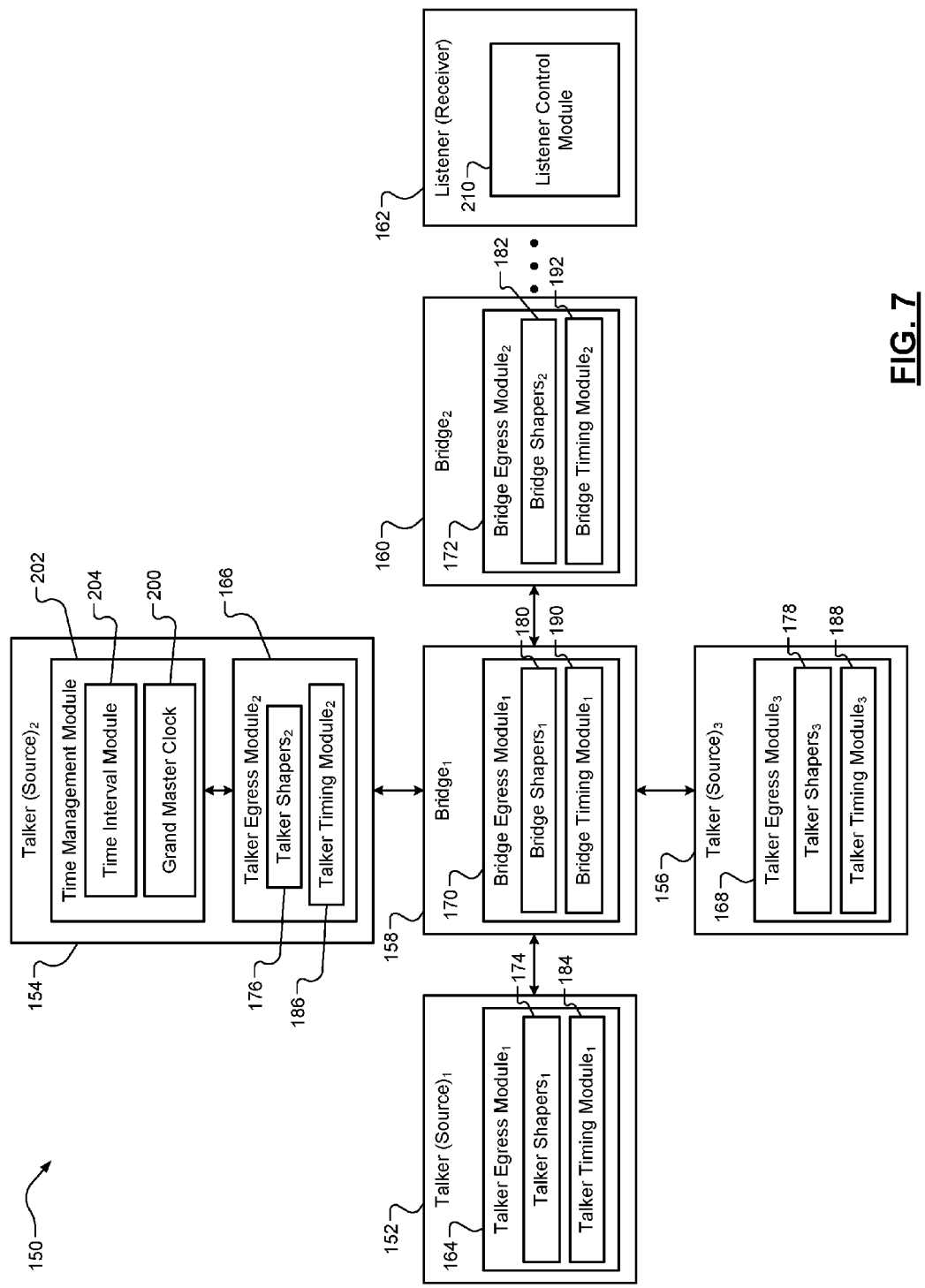
FIG. 7 is a functional block diagram of a non-arbitrary network in accordance with the present disclosure.

In FIG. 7, a non-arbitrary network 150 is shown. The non-arbitrary network 150 includes one or more talkers (three talkers 152, 154, 156 are shown), one or more bridges (two bridges 158, 160 are shown) and a listener 162. The talkers 152, 154, 156 may be referred to as a source, as the talkers transmit data to the listener 162. The listener 162 may be referred to as a receiver, as the listener 162 receives data from the talkers 152, 154, 156. The talkers 152, 154, 156 and bridges 158, 160 may each include respective egress modules 164, 166, 168, 170, 172. The bridges 158, 160 may satisfy IEEE 802.1 AS, which provides precise timing protocols (PTPs). The bridges 158, 160 provide a daisy chain of network devices between end stations (e.g., the talkers 152, 154, 156 and the listener 162). Each of the egress modules 164, 166, 168, 170, 172 may include respective shapers 174, 176, 178, 180, 182 and/or timing modules 184, 186, 188, 190, 192.

The shapers 174, 176, 178, 180, 182 may include blocking shapers and/or deblocking shapers. The blocking shapers may include time-unaware blocking shapers and time-aware blocking shapers (TABSs). Examples of time-unaware blocking shapers, time-aware blocking shapers, and deblocking shapers are shown in FIGS. 10-11 and 13-15. The time-aware blocking shapers operate based on a global clock signal generated by a grand master clock 200. The grand master clock 200 may be located in any of the network devices of the network 150. The global clock signal may be shared with any of the network devices in the network 150. As an example, the grand master clock 200 is shown in the second talker 154, but may be located in one of the other talkers 152, 156, one of the bridges 158, 160, the listener 162, or other network device connected to the network 150.

The time-aware blocking shapers may delay a transmission start of non-highest priority data (e.g., non-Class A data or Class B data and/or non-AVB data). This delay may be performed based on transmission timing of the highest priority data (e.g., Class A data). Transmission timing of the Class A and non-Class A data may be provided by the timing modules 184, 186, 188, 190, 192, which generate priority timing signals. Each priority timing signal may indicate a window in which corresponding data is permitted or not permitted to be transmitted. The priority timing signals generated for non-Class A data (or Class B data and/or unprotected data) may be generated based on an allocated time period in each periodic transmission time interval. The highest priority data (Class A data) is transmitted in each of the allocated time periods. This insures that an output of an egress module is idle such that Class A bursts are not interfered with by transmission of other data (non-highest priority data).

The network device that includes the grand master clock 200 or one of the other network devices in the network 150 may include a time management module 202. The network device having the grand master clock 200 and/or the time management module 202 may be referred to as a master device. Devices not having the grand master clock 200 and/or the time management module 202 may be referred to as slave devices. The time management module 202 may include the grand master clock 200 and/or a time interval module 204. The time interval module 204 may set the periodic transmission time interval (i.e. duration of the periodic transmission time interval) and a start times $t_0$ of each of the periodic transmission time intervals. The global clock signal, the periodic transmission time interval and the start times $t_0$ of the periodic transmission time intervals may be shared between the network devices using a management information base (MIB) modules and/or a simple management network protocols (SMNPs).

The bridge (e.g., the bridge 158) closest to the talker (e.g., talker 152) may perform as a time translator device. A time translator device may be incorporated between a talker without time-aware blocking shaper(s) and a bridge with time-aware blocking shaper(s). The bridge may have a single input port and a single output port or two of the ports of the bridge may be enabled while other of the ports are disabled. An egress module of the bridge may enable and disable the ports. While operating as a time translator device, the bridge has a single input port enabled and a single output port enabled. Also, while operating as a time translator device (referred to as operating in a time translator mode), the bridge performs time-aware deblocking of Class A frames and/or time-aware blocking of non-Class A frames to adjust transmission timing of Class A frames and/or non-Class A frames. This is described in more detail below with respect to FIG. 10 and a corresponding time translator mode of operation.

The listener 162 receives data from the talkers 152, 154, 156 via the bridges 158, 160. The listener 162 may include a listener control module 210. The listener control module 210 may operate and/or monitor or operate one or more sensors, motors, actuators, or other devices of the network based on the data received from the talkers 152, 154, 156.

The talkers 152, 154, 156, bridges 158, 160, and/or listener 162 may communicate with each other via wired or wireless connections and/or mediums. The wireless connections and/or mediums may satisfy, for example, IEEE standards 802.11, 802.11a, 802.11b, 802.11g, 802.11h, 802.11n, 802.16, and 802.20.

Figure 8:
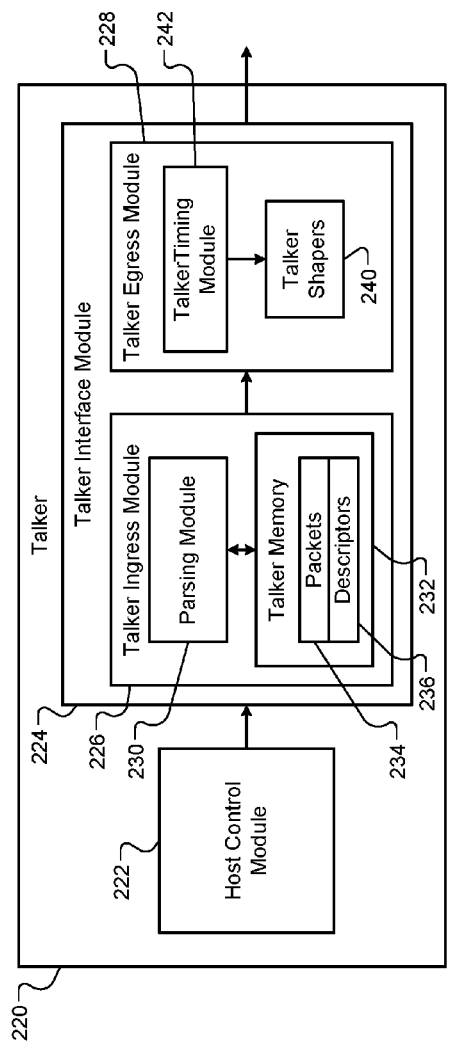
FIG. 8 is a functional block diagram of a talker in accordance with the present disclosure.

In FIG. 8, an example of one of the talkers 152, 154, 156 (designated 220) of the network of FIG. 7 is shown. The talker 220 includes a host control module 222 and an interface module 224. The host control module 222 may include, for example, a processor and provide data of different priority levels to the interface module 224. The data may include Class A data, Class B data, and non-AVB data. The interface module 224 may be, for example, a network interface card or other suitable interface. The interface module 224 includes a talker ingress module 226 and a talker egress module 228.

The talker ingress module 226 may, include, for example, a talker parsing module 230 and talker memory 232. The talker parsing module 230 may receive packets 234 of data from the host control module 222, parse the packets 234, and generate descriptors 236 based on headers provided in frames of the packets 234. Each of the descriptors 236 may include a size of a corresponding packet and/or frame, a start time of a periodic transmission time interval, a length of the periodic transmission time interval, and/or source and/or destination addresses. Each packet received may include a predetermined number of frames of data. The packets 234 and the descriptors 236 may be stored in the talker memory 232 and provided in a descriptor signal to the talker egress module 228.

The talker egress module 228 includes talker shapers 240 (e.g., the talker shapers 174, 176, 178 of FIG. 7) and a talker timing module 242 (e.g., one of the talker timing modules 184, 186, 188 of FIG. 7). The talker shapers 240 operate based on priority timing signals from the talker timing module 242. The talker ingress module 226 and/or the talker egress module 228 may include a media access controller (MAC).

Figure 9:
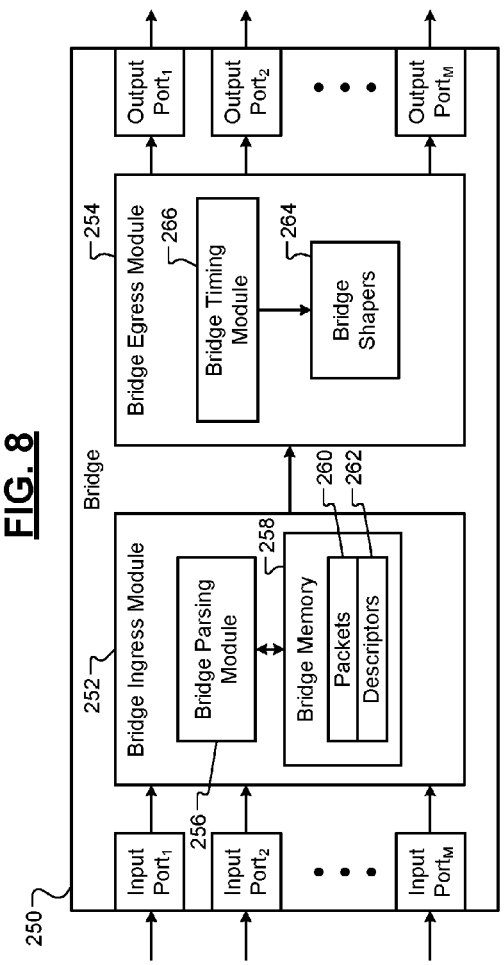
FIG. 9 is a functional block diagram of a bridge in accordance with the present disclosure.

In FIG. 9, an example of one of the bridges 158, 160 (designated 250) of FIG. 7 is shown. The bridge 250 includes input ports$_{1-N}$, a bridge ingress module 252, a bridge egress module 254 and output ports$_{1-M}$. Although the ports N, M are labeled as input ports and output ports, each of the ports N, M may perform as an input port and/or an output port. Also, each of the ports N, M may be connected to the bridge ingress module 252 and/or the bridge egress module 254. In addition, the bridge 250 may include any number of input ports and output ports.

The bridge ingress module 252 includes a bridge parsing module 256 and a bridge memory 258. The bridge parsing module 256 may receive data from a talker, a bridge, and/or a time translator device. The bridge parsing module 256 may parse packets 260 received and generate descriptors 262 based on headers provided in frames of the packets 260. Each of the descriptors 262 may include a size of a corresponding packet and/or frame, a start time of a periodic transmission time interval, a length of the periodic transmission time interval, and/or source and/or destination addresses. Each packet received may include a predetermined number of frames of data. The packets 260 and the descriptors 262 may be stored in the bridge memory 258 and provided in a descriptor signal to the bridge egress module 254. The bridge egress module 254 includes bridge shapers 264 (e.g., bridge shapers 180, 182 of FIG. 7) and a bridge timing module 266 (e.g., one of bridge timing modules 190, 192 of FIG. 7). The bridge shapers 264 operate based on priority timing signals from the bridge timing module 266. The bridge ingress module 252 and/or the bridge egress module 254 may include a MAC.

In FIG. 10, a network device 270 is shown. The network device 270 includes a data blocking system 271 with an ingress module 272 and an egress module 274 with an egress network 276. Each of the talkers 152, 154, 156 and bridges 158, 160 of the network 150 of FIG. 7 may be replaced with the network device 270 and/or include the ingress module 272 and/or the egress module 274. The network device 270 may operate as a talker, a bridge and a time translator device and as such has a talker mode, a bridge mode, and time translator mode.

The ingress module 272 receives frames of data (hereinafter referred to as frames) from: a host control module of a talker; a bridge; and/or a time translator device. The ingress module 272 parses the frames and provides the frames to a respective queue of the egress module 274. The egress network 276 may be associated with a single output port (e.g., one of the output ports M of FIG. 9). The egress module 274 may include a similar egress network for other output ports. The egress network 276 includes queues$_{1-X}$ having respective priority levels. The egress network 276 may include any number of queues for each priority level. As an example, the egress module 274 may include one or more Class A queues 278 that receive Class A data, one or more Class B queues 280 that receive Class B data, and one or more non-AVB queues 282 that receive non-AVB data. Each of the queues$_{1-X}$ may perform as a register and store frames of a respective priority level.

The egress network 276 also includes a timing module 290, a time-aware deblocking shaper 292 (TADS, shown in FIG. 10 as deblocking shaper $f_p$ and hereinafter referred to as a deblocking shaper), time-unaware blocking shapers 294 (shown in FIG. 10 as blocking shapers $f_Q$), time-aware blocking shapers 296 (TABSs, shown in FIG. 10 as blocking shapers $f_B$), a selector module 298, an activation module 300, and a first multiplexer 302. The time-unaware blocking shapers 294 and the time-aware blocking shapers 296 may be referred to individually as a blocking shaper and/or collectively as blocking shapers. The deblocking shaper 292 and the blocking shapers 294, 296 may each be referred to as a shaper module.

The timing module 290 generates priority timing signals for each of the deblocking shaper 292 and the time-aware blocking shapers 296. Each of the priority timing signals provide a time window in which the deblocking shaper 292 and the time-aware blocking shapers 296 are to either permit data passage or block data from being selected by the selector module 298. The priority timing signal generated for the deblocking shaper 292 may indicate when the deblocking shaper 292 is not to block Class A frames from passing to the first multiplexer 302. The priority timing signals generated for the time-aware blocking shapers 296 may indicate when the time-aware blocking shapers 296 are to block data in the Class B queues and the non-AVB queues.

The time-aware blocking shapers 296 may each receive the same priority timing signal or may receive respective priority timing signals.

The network device 270 may include any number of deblocking shapers and blocking shapers. The number of deblocking shapers and blocking shapers may depend upon the number of Class A queues, Class B queues, and non-AVB queues. The Class A queues may each have a corresponding deblocking shaper. The deblocking shapers and corresponding transmission paths provide a lowest level of latency as interference from other transmission paths with a lower priority level is prevented.

The deblocking shaper 292 may be used to assure that data is transmitted from, for example, a talker and/or a time translator device at appropriate times. When operating in the talker mode, the network device 270 may load up Class A frames in the Class A queue 278 prior to a Class A burst. The Class A burst includes forwarding Class A frames from the Class A queue 278 and transmitting the Class A frames from the network device 270 for a predetermined period within a periodic transmission time interval. The deblocking shaper 292 controls when the Class A burst starts and further controls transmit timing of the Class A frames during the Class A burst. During the Class A burst, the time-aware blocking shapers 296 block transmission of non-Class A frames (e.g., Class B frames or non-AVB data) causing the non-Class A queues to be idle.

The Class A queues 278 and Class B queues 280 may each have a corresponding time-unaware blocking shaper (e.g., one of the time-unaware blocking shapers 294). The Class B queues 280 and non-AVB queues 282 may each have a corresponding time-aware blocking shaper (e.g., one of the time-aware blocking shapers 296). The time-unaware blocking shapers 294 are connected in series with a respective one of the deblocking shaper 292 and time-aware blocking shapers 296. The time-unaware blocking shapers 294 are used to pace transmission of frames and may satisfy IEEE 802.1 Qav. The time-aware blocking shapers 296 block the selector module 298 from selecting frames in the Class B queues 280 and in the non-AVB queues 282 during transmission periods of the Class A frames. This prevents interference of Class A frames with other frames and minimizes latency of Class A frames.

The time-unaware blocking shapers 294 may operate in parallel with the deblocking shaper 292 and time-aware blocking shapers 296 relative to the selector module 298. For example, Class A data may pass from a Class A queue 278 to the first multiplexer 302 based on the deblocking shaper 292 and the corresponding one of the time-unaware blocking shapers 294. Class B data may pass from Class B queues 280 to the first multiplexer 302 based on the corresponding ones of the time-unaware blocking shapers 294 and time-aware blocking shapers 296.

Each of the queues$_{1-X}$, deblocking shaper 292, and blocking shapers 294, 296 has an associated transmission path. Each transmission path includes a respective one of the queues$_{1-X}$ and may include one or more of the deblocking shaper 292 and blocking shapers 294, 296. Each of the deblocking shaper 292 and blocking shapers 294, 296 generate respective deblocking and blocking signals. The deblocking and blocking signals are received by the selector module 298 and indicate when a frame is in a corresponding queue and is ready to be forwarded to the first multiplexer 302.

A frame may be in a queue and a corresponding deblocking or blocking signal may indicate that there is not a frame in the queue and/or that the frame is not ready to be selected. The deblocking or blocking signal may indicate that there is not a frame and/or that the frame is not ready to be transmitted based on a corresponding priority timing signal. This blocks the transmission of frames at inappropriate times. As an example, one of the time-aware blocking shapers 296 may generate a blocking signal when a Class B frame is in the Class B queue 280. The blocking signal may indicate that a Class B frame is not in the Class B queue 280, thereby blocking the selector module 298 from selecting the Class B frame prior to and/or during, for example, a transmission period of a Class A frame. This prevents transmission interference with the Class A frame.

The selector module 298 generates a select signal, which is received by the first multiplexer 302 to select frames from the queues$_{1-X}$. The selector module 298 may be a strict style selector. A strict style selector permits all frames in a highest priority level queue that has frames to be transmitted before permitting transmission of frames from a next highest priority level queue. This occurs when the strict selector is directly monitoring states of the queues including determining whether frames are in the queues.

In the following implementations, instead of the selector module 298 directly monitoring states of the queues$_{1-X}$, the selector module 298 monitors deblocking or blocking signals received from the deblocking shaper 292 and/or the blocking shapers 294, 296. The selector module 298 then generates the select signal to permit passing of a frame from a queue based on the deblocking or blocking signals. The deblocking shaper 292 and the blocking shapers 294, 296 prevent the selector module 298 from directly "seeing" frames that are in the queues$_{1-X}$.

The activation module 300 enables and disables the deblocking shaper 292 and the blocking shapers 294, 296 based on the operating mode of the network device 270. For example, when operating in the talker mode and/or the time translator mode, the deblocking shaper 292 may be enabled. Time-unaware blocking shapers 294 may be disabled to reduce latency of Class A frames. The time-aware blocking shapers 296 may be enabled. In one implementation, the time-aware blocking shapers 296 are disabled. As another example, when operating in the bridge mode, the deblocking shaper 292 may be disabled and blocking shapers 294, 296 may be enabled.

As another example, if the network device 270 is used in a pro-audio environment, the time-unaware blocking shapers 294 may be enabled and the deblocking shaper 292 may be disabled. As yet another example, in an automotive environment when Class A frames are transmitted, the time-unaware blocking shapers 294 may be disabled and the deblocking shaper 292 may be enabled. This reduces latency of the Class A frames and further allows for predetermined bandwidth and maximum frame latency requirements to be satisfied.

When operating in the time translator mode, the network device 270 may be connected to an output of a talker to provide deblocking. The network device 270 may be configured as a time translator device and incorporated at an output of a time-unaware talker to provide deblocking and adjust transmission timing of Class A frames. The network device 270 may enable a single input port and a single output port while disabling other ports. This may be performed when the talker does not include deblocking shapers and/or time-aware blocking shapers to assure that Class A frames are transmitted at the appropriate times. Transmitting Class A frames at appropriate times includes: initiating transmission of Class A frames a predetermined start time(s) $t_0$ of periodic transmission time intervals; and transmission of Class A frames at appropriate times during predetermined Class A burst windows of the periodic transmission time intervals.

The egress module 274 may also operate in a cut-through mode and include a cut-through module 310 and a second multiplexer 312. The cut-through module 310 and the second multiplexer 312 are used to further minimize latency of highest priority frames (e.g., Class A frames). The cut-through module 310 may be time-aware by receiving and operating based on the global clock signal (designated 313). The cut-through module 310 may be referred to as a time-aware cut-through shaper (TACS).

The cut-through module 310 monitors activity at an output 314 (e.g., an output port) of the network device 270 and permits Class A frames to pass from the ingress module 272 to the second multiplexer 312 bypassing the Class A queues 278, the corresponding deblocking shaper 292 and/or time-unaware blocking shapers 294, and the first multiplexer 302. The activity at the output 314 may be directly monitored as shown or the cut-through module 310 may receive a line activity signal generated by the selector module 298 and/or the egress module 274. The line activity signal may indicate whether there is data transmission activity at the output.

The cut-through module 310 generates a second select signal to select one of an output 315 of the first multiplexer 302 and a data output 316 of the ingress module 272. The second multiplexer 312 receives the second select signal and forwards Class A frames from either the output 315 or the output 316 based on the second select signal. Transmission of Class A frames from the output 316 may be referred to as type 3 data transmission.

The bypassing performed by the cut-through module 310 may occur prior to the ingress module 272 receiving all Class A frames of transmitted packets and/or prior to receiving all bits of a Class A frame. After a predetermined number of bytes (e.g., 64 bytes) of Class A data has been received by the ingress module, the bytes may be passed from the ingress module 272 to the second multiplexer 312. The predetermined number of bytes may be associated with, for example, header data. The header data may include source and target addresses, frame size, data type, and/or other packet and/or frame information.

Since the time-aware blocking shapers 296 block non-Class A frames of data during Class A bursts, the output 314 is idle and the Class A frames may be passed directly to the output 314 via the second multiplexer 312. This eliminates latencies associated with storing the frames in the Class A queue 278 and corresponding shapers 292, 294.

If the cut-through module 310 is enabled and used to bypass Class A frames, a maximum latency for the Class A frames for a bridge is equal to time delay of the bridge $t_{Bridge}$ plus time delay associated with a cut-through point (e.g., the second multiplexer) $t_{Cut}$ plus a cable maximum transmission time $t_{Cable}$. As an example, with a bridge delay of two slot times (or 1.024 μs) and a cut-through delay time of one slot time (0.512 μs), a maximum latency may be 2.074 μs when the maximum cable transmission time $t_{Cable}$ is 0.538 μs. This latency is provided regardless of the size of the Class A frames being transmitted, as Class A bits are transmitted from the bridge prior to all Class A bits being received by the bridge and/or as the Class A bits are outputted from the ingress module 272. The latency associated with type 3 transmissions is less than the latency associated with type 1 (e.g., 13.898 μs) and type 2 (e.g., 4.122 μs) transmissions.

The cut-through module 310 may signal the ingress module 272 to bypass the Class A frames to the second multiplexer 312 instead of providing the Class A frames to the Class A queue(s). The cut-through module 310 may be incorporated in the ingress module 272 instead of being in the egress module 274, as shown.

Referring now also to FIG. 11, a time-unaware blocking shaper 320 is shown. The time-unaware blocking shaper 320 may replace any one of the time-unaware blocking shapers 294 of FIG. 10. The time-unaware blocking shaper 320 may not operate based on a global clock signal. The time-unaware blocking shaper 320 may operate based on a local clock 321. The local clock 321 may generate a clock signal that is independent of the global clock signal. The time-unaware blocking shaper 320 spreads out frames of data prior to transmission and prevents the selector module 298 from "seeing" frames in the queues 278, 280 with protected data. This includes providing IFGs between each pair of sequential frames of data.

The time-unaware blocking shaper 320 includes a first counter 322 and a queue monitoring module 324. The first counter 322 counts credits for a queue 326 (e.g., one of the queues 278, 280) being monitored. The queue monitoring module 324 monitors whether there is a frame in the queue 326 and increments the first counter 322 when a frame is in the queue 326 and is not permitted to pass from the queue 326 to the first multiplexer 302. The queue monitoring module 324 decrements the first counter 322 when a frame is passed to the first multiplexer 302. The first counter 322 may have a high limit maximizing a first count associated with the queue 326. The first counter 322 may also have a low limit minimizing the first count associated with the queue 326.

Figure 12:
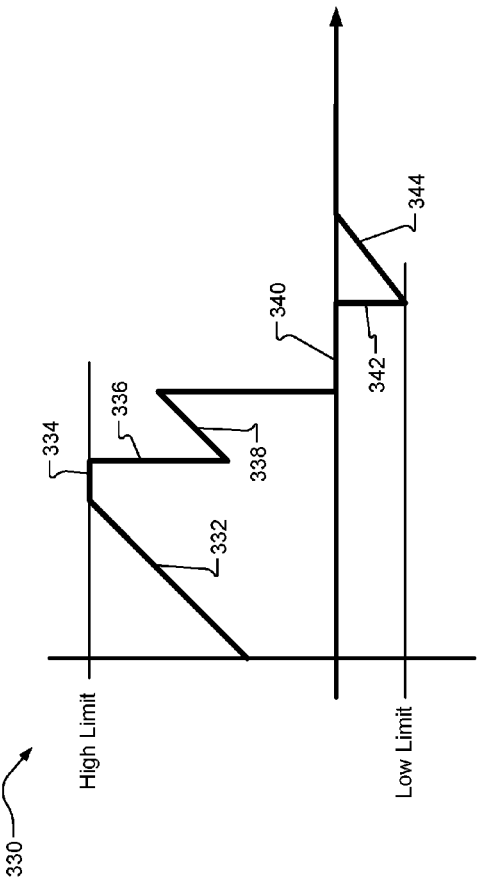
FIG. 12 is a graph illustrating count values for a time-unaware blocking shaper over time in accordance with the present disclosure.

Referring now also to FIG. 12, a graph 330 illustrating count values for the time-unaware blocking shaper 320 over time is shown. Increments of the first count when a frame is not permitted to pass from the queue to the first multiplexer 302 is represented by a first line segment 332. The frame may not be permitted to pass due to interference (i.e. frame(s) in one or more other queues$_{1-X}$ being transmitted). The first count then reaches a high limit 334 and is maintained at a current count value. Frames are then permitted to pass to the first multiplexer 302 and the first count is decremented, as represented by a first vertical line segment 336. The first count may then again be incremented when frames are not passed from the queue 326 to the first multiplexer 302, as represented by a line segment 338.

The first count may be reset to zero when there are no frames in the queue, as represented by a line segment 340. When a frame arrives in the queue 326 and is transmitted subsequent to the first count being at zero and there is not interference, the first count may be decremented to the low limit 342. The count may be increased to zero when there is no frames in the queue to transmit, represented by line segment 344. The above-described incrementing and decrementing may be based on the local clock 321, predetermined time intervals, and/or the line status signal (designated 346).

The line status signal 346 may indicate whether data is being transmitted from the egress module 274. The line status signal 346 may indicate an output of the first multiplexer 302, an output of the second multiplexer 312, and/or may be generated by the selector module 298 and/or the egress module 274.

The queue monitoring module 324 generates a first blocking signal 350 based on the first count of the first counter 322. The first blocking signal 350 may be generated based on a descriptor signal 352 from the ingress module 272. The descriptor signal 352 may indicate when there is a frame in the queue 326. Data is passed from the queue 326 through the queue monitoring module 324 to a corresponding deblocking shaper or time-aware blocking shaper (designated 354) followed by the first multiplexer 302.

Figure 13:
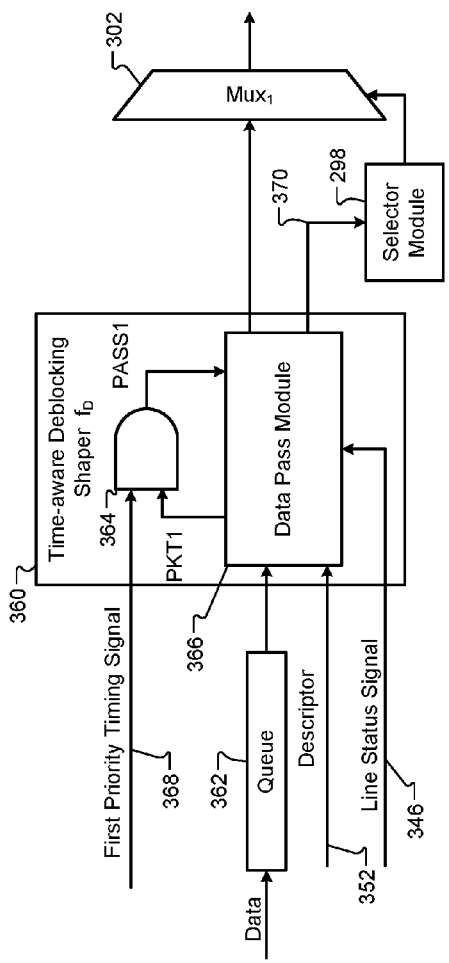
FIG. 13 is a functional block diagram of a deblocking shaper in accordance with the present disclosure.

Referring to FIGS. 10 and 13, a deblocking shaper 360 is shown. The deblocking shaper 360 may replace the deblocking shaper 292 or other deblocking shaper of the network device 270 of FIG. 10. The deblocking shaper 360 blocks data in a corresponding highest priority level queue 362 (e.g., queue 278) until a time window when the Class A data is permitted to be forwarded from the queue 362 to the first multiplexer 302 and/or transmitted from the egress module 274 and network device 270. The deblocking shaper 360 includes a logic module 364 and a data pass module 366. The logic module 364 receives a first priority timing signal 368 (referred to as a highest priority go signal) and a first frame signal PKT1. The first priority timing signal 368 may indicate when transmission of Class A frames is permitted. The first frame signal PKT1 may be generated by the data pass module 366 and may indicate when there is a frame in the queue 362.

The logic module 364 may include a NAND gate as shown and/or other suitable logic devices. The NAND gate may receive the first priority timing signal 368 and the first frame signal PKT1 and generate a first pass signal PASS1. The first pass signal PASS1 indicates when the Class A frames are permitted to pass from the queue 362 to the first multiplexer 302. The data pass module 366 generates a deblocking signal 370 based on the first pass signal PASS1 and may generate the deblocking signal 370 based on the descriptor signal 352 and/or the line status signal 346.

Figure 14:
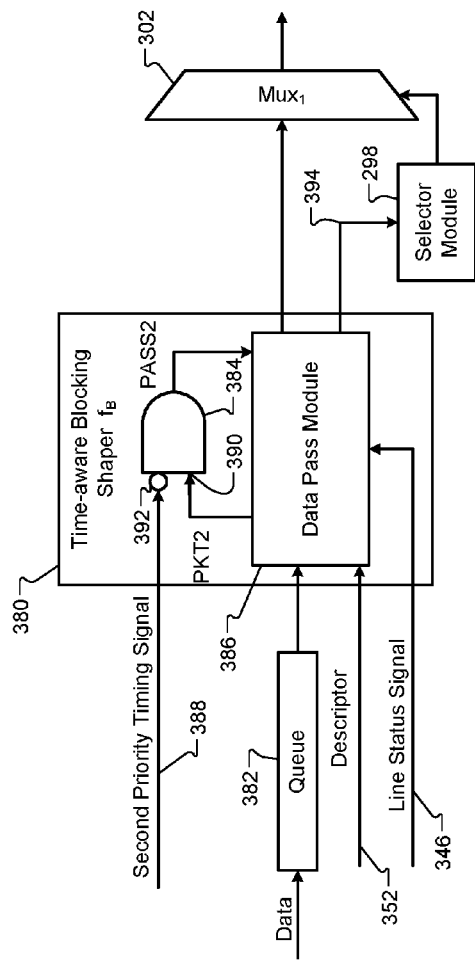
FIG. 14 is a functional block diagram of a time-aware blocking shaper in accordance with the present disclosure.

Referring to FIGS. 10 and 14, a time-aware blocking shaper 380 is shown. The time-aware blocking shaper 380 may replace any one of the time-aware blocking shapers 296 of FIG. 10. The time-aware blocking shaper 380 blocks data in a corresponding queue 382 (e.g., one of the queues 280, 282) while Class A data is forwarded to the first multiplexer 302 and/or transmitted out of the network device 270. The time-aware blocking shaper 380 includes a logic module 384 and a data pass module 386.

The logic module 384 receives a second priority timing signal 388 (referred to as a block lowest priorities signal) and a second frame signal PK2. The second priority timing signal 388 indicates when transmission of Class B frames and/or non-AVB frames is not permitted. The second frame signal PKT2 may be generated by the data pass module 386 and may indicate when there is a frame in the queue 382.

The logic module 384 may include a NAND gate as shown with a non-inverted input 390 and an inverted input 392 and/or other suitable logic devices. The non-inverted input may receive the second frame signal PKT2. The inverted input 392 may receive the second priority timing signal 388. The logic module 384 generates a second pass signal PASS2. The second pass signal PASS2 indicates when the Class B frames and/or non-AVB frames are permitted to pass from the queue 382 to the first multiplexer 302. The data pass module 386 generates a second blocking signal 394 based on the second pass signal PASS2 and may generate the second blocking signal 394 based on the descriptor signal 352 and/or the line status signal 346.

Figure 15:
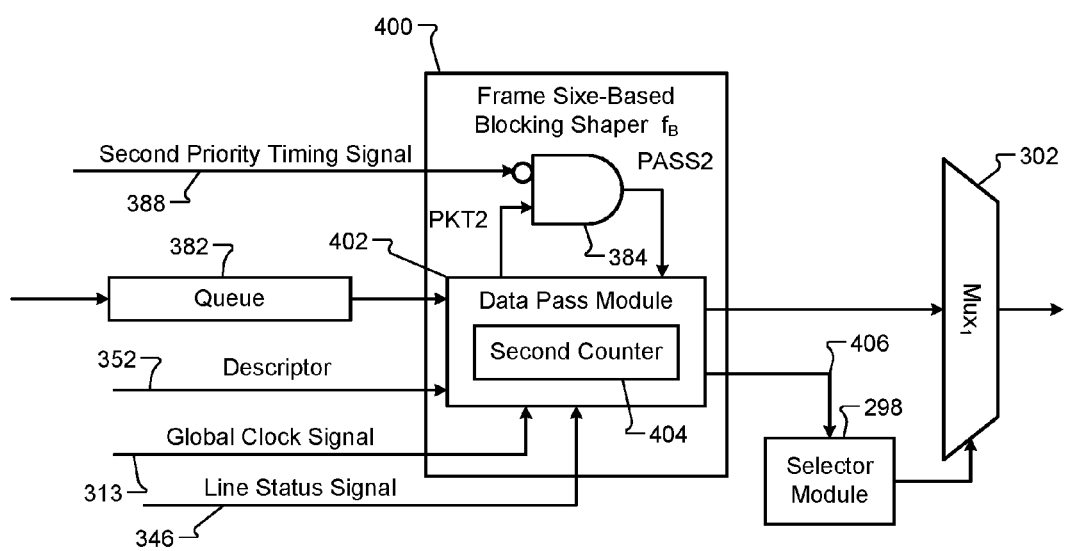
FIG. 15 is a functional block diagram of a frame size-based blocking shaper in accordance with the present disclosure.

Referring to FIGS. 10 and 15, a frame size-based blocking shaper 400 is shown. The frame size-based blocking shaper 400 may replace any one of the time-aware blocking shapers 296 of FIG. 10. The frame size-based blocking shaper 400 may include the logic module 384 and a data pass module 402 with a second counter 404. The logic module receives the second priority timing signal 388, the second frame signal PKT2 and generates the second pass signal PASS2. The data pass module generates the second frame signal PKT2 based on whether there is a frame in the queue 382. The data pass module 402 generates the second blocking signal 406 based on the second pass signal PASS2, a second count of the second counter 404, the descriptor signal 352, the global clock signal 313, and/or the line status signal 346.

Referring now to FIGS. 10 and 15, the data pass module 402 permits head-of-line frames to pass to the first multiplier 302 based on sizes of the head-of-line frames and time remaining before a next Class A burst. A head-of-line frame refers to a next frame in a queue to be forwarded from the queue to the first multiplexer 302.

Data in any of the non-Class A queues 280, 282 may be blocked prior to a next Class A burst window. For example, a non-Class A queue may have a head-of-line frame (e.g., 1522 bytes) ready to be transmitted prior to a next Class A burst window. If the head-of-line frame cannot be transmitted completely prior to the start of the Class A burst window, then the blocking shaper may block (delay) transmission of the head-of-line frame. A frame in another one of the non-Class A queues having fewer bytes (e.g., 64 bytes) than the frame in the non-Class A queue (of FIG. 15) may be permitted to pass to the multiplexer, as the smaller frame may be transmitted prior to the next Class A burst window.

The second counter 404 may start counting at a count value equal to a predetermined maximum frame size (e.g., 1522) and be decremented beginning at a start of a blocking window. The second counter 404 may be used to gate off the corresponding queue 382 from passing frames when the number of bytes in a head-of-line frame in the queue 382 is larger than the second count. A non-Class A queue with a head-of-line frame that is able to be transmitted completely prior to the Class A burst window may not be blocked. This is further described with respect to FIGS. 16A-E and 17.

In FIGS. 16A-E, frame size-based data progressions through a bridge 410 are shown. The bridge 410 may be one of the bridges 158, 160 of FIG. 7. The bridge 410 includes an ingress module 412 with memory 414, a Class A queue 416, a Class B queue 417, a first non-AVB queue 418, a second non-AVB queue 419 (e.g., queues$_{1-X}$ of FIG. 10), a multiplexer 420 (e.g., the first multiplexer 302 of FIG. 10), and an output port 422. The first non-AVB queue 418 may store management data and the second non-AVB queue 419 may store legacy data. The bridge 410 may be configured similar to the network device 270 of FIG. 10. Although not shown in FIGS. 16A-E, the bridge 410 may include frame size-based blocking shapers (e.g., the frame size-based blocking shaper 400 of FIG. 15) between respective ones of the queues 416-419 and the multiplexer 420.

In FIG. 16A, a state of the bridge 410 is shown at time $t_0$ minus, for example, 16 µs or 16 µs prior to a Class A burst period. The time $t_0$ refers to a start time of the Class A burst period. Class B frames 430 are stored in the Class B queue 417. Management frames n, m are stored in the first non-AVB queue 418. Legacy frames 431 are stored in the second non-AVB queue 419. The Class B frames 430 may be gated (or shaped) by a time-unaware blocking shaper and are prevented from being transmitted at time $t_0$ minus 16 µs. As a result, the management frame n may begin to be transmitted from the bridge 410.

In FIG. 16B, a state of the bridge 410 is shown at time $t_0$ minus, for example, 3.664 µs. At this time, transmission of the management frame n from the bridge 410 is completed. The 3.664 µs is equal to the 16 µs minus 12.336 µs for the management frame n to be transmitted. At this time, the Class B frames may be ready to transmit and have credits to transmit two frames. Time to transmit a frame of 300 bytes of Class B data is 2.56 µs (includes 20 bytes of preamble and/or IFG time). Since there is 3.664 µs remaining before time $t_0$, one frame is permitted to be transmitted. The other Class B frame that is ready to be transmitted is blocked.

Figure 16C:
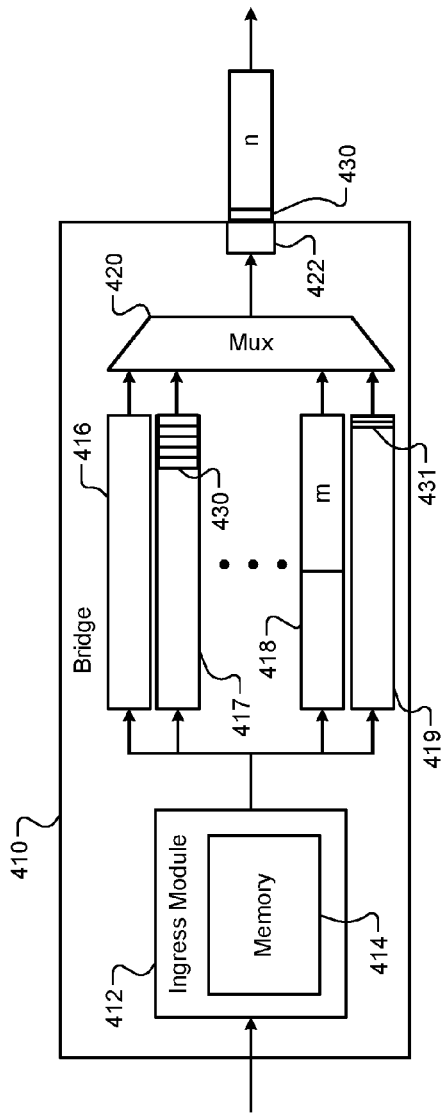

In FIG. 16C, a state of the bridge 410 is shown at time $t_0$ minus, for example, 1.104 µs. Since there is 1.104 µs before time $t_0$, the Class B frames 430 and the second non-AVB frame m are blocked. The Legacy frames 431 may be, for example, 64 bytes in length. Time to transmit one of the Legacy frames 431 including 20 bytes of preamble and IFG time is 0.672 µs, which is less than the 1.104 µs. For this reason, one of the Legacy frames 431 is permitted to pass to the multiplexer 420.

Figure 16D:
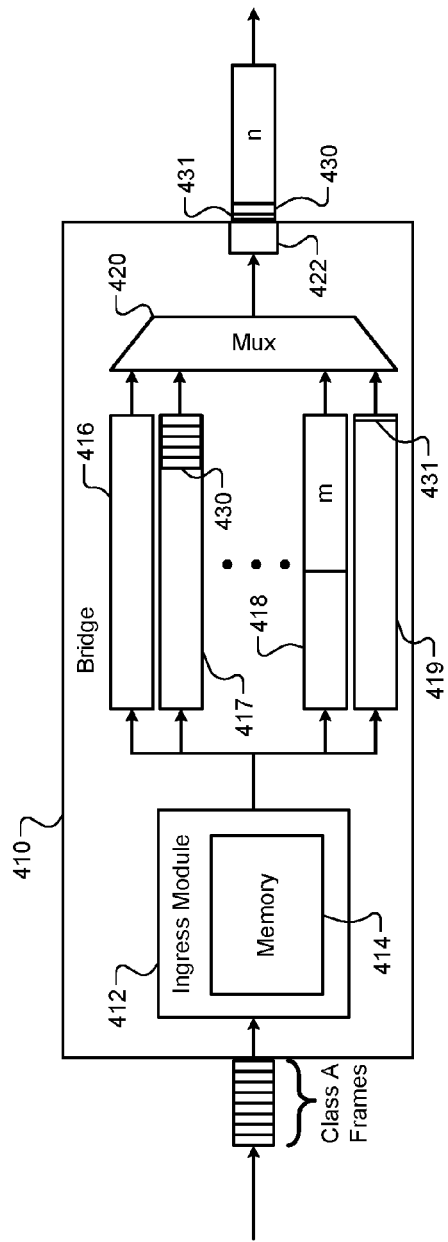
Figure 16E:
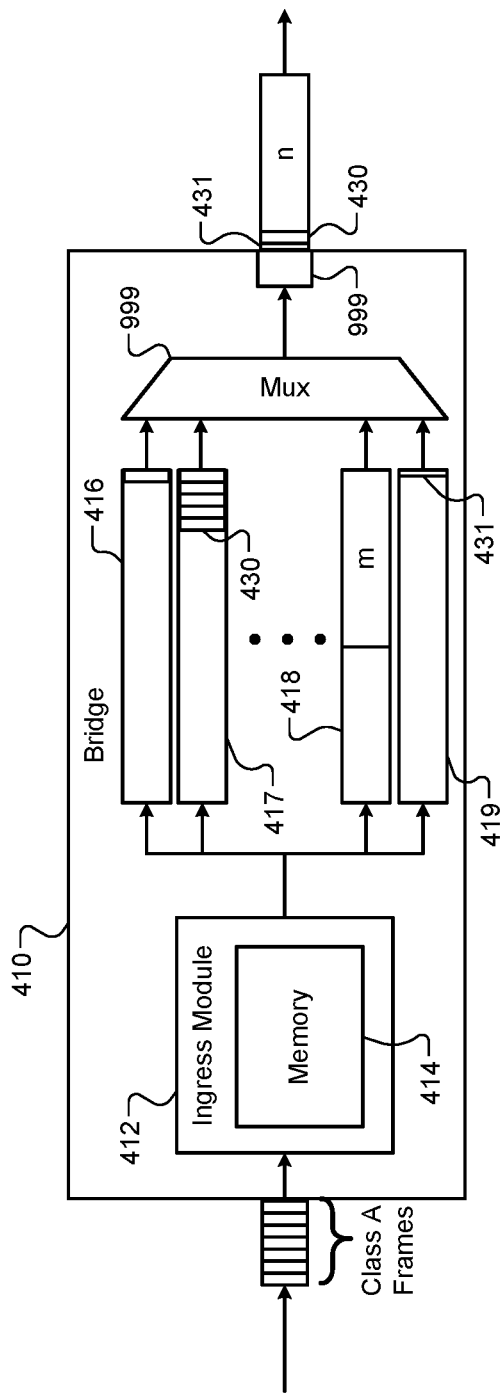

In FIG. 16D, a state of the bridge 410 at time $t_0$ minus, for example, 0.432 µs is shown. As time remaining to $t_0$ is less than 0.672 µs, the remaining frames are blocked. This allows the output port 422 to be idle at $t_0$. In FIG. 16E, Class A frames arrive at the bridge 410 and are permitted to be stored in the Class A queue 416 and be transmitted from the bridge 410 without interference from the frames stored in the other queues 417-419. The time-aware blocking shapers may release (i.e. no longer block) the Class B queue 417 and the non-AVB queues 418-419 subsequent to a predetermined period after time $t_0$. The queues 417-419 may be released, since the selector module 298 prevents selection of these queues when data is in the Class A queue 416 and is being transmitted out the output port 422. For this reason, the burst of the Class A frames continues until no more Class A frames are stored in the Class A queue 416. Frames in queues 417-419 may be transmitted when the Class A queue 416 is emptied.

By using time-aware blocking shapers for each of the non-Class A queues 417-419 such that the output port 422 is idle at time $t_0$ (start of Class A burst) and by accounting for head-of-line sizes of frames in the non-Class A queues 417-419, efficient use of time is provided. Non-Class A frames that can be transmitted prior to time $t_0$ are transmitted based on priority.

Figure 17:
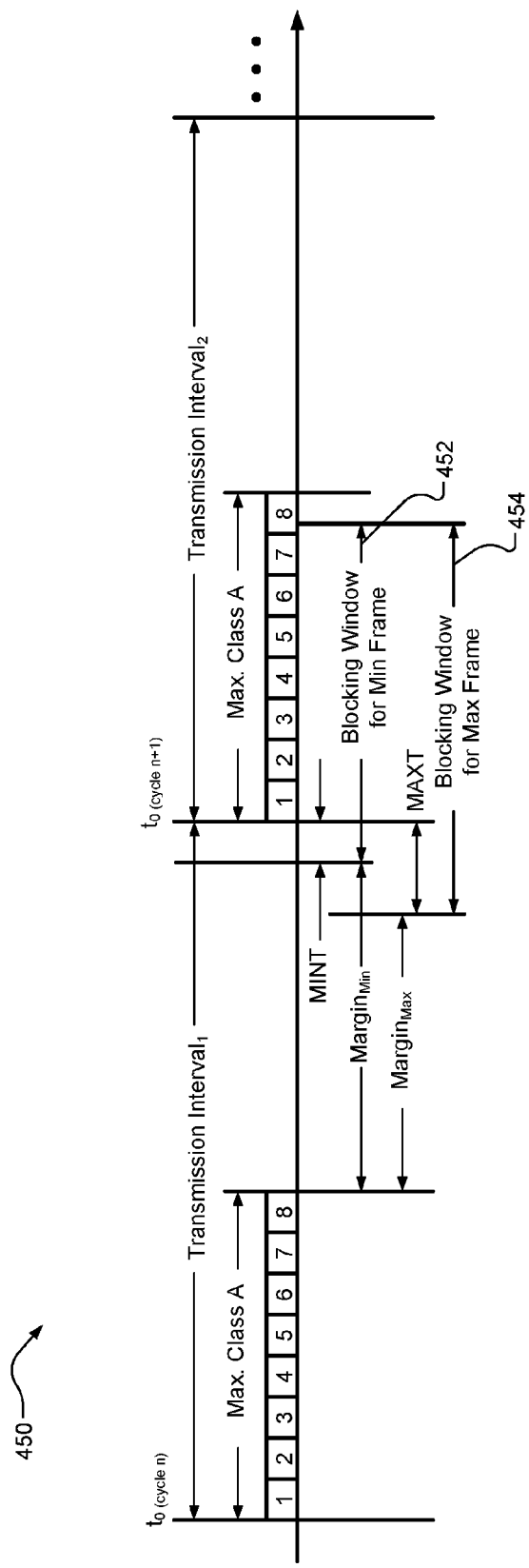
FIG. 17 is a timing diagram illustrating blocking windows relative to Class A allocated time periods in accordance with the present disclosure.

In FIG. 17, a timing diagram 450 is shown illustrating blocking windows relative to Class A allocated time periods. In order to prevent interference with Class A data, blocking windows may be used to prevent transmission of frames having a determined size. The size may be predetermined or determined based on descriptors provided in a descriptor signal (e.g., the descriptor signal 352), as described above. The above-described priority timing signals and/or selection of queues may be performed based on the blocking windows and the line status signals.

In FIG. 17, two blocking windows 452, 454 relative to transmission time of the eight blocks of data 1-8 are shown. The first blocking window 452 is associated with a minimum size interference frame (e.g., 256 bytes). The second blocking window 454 is associated with a maximum interference size frame (e.g., 1500 bytes). The first blocking window 452 includes time MINT (e.g., 23.84 µs) to transmit the minimum size frame and a time to transmit at least seven of the Class A frames and a portion of an eighth Class A frame. The second blocking window 454 includes time MAXT (e.g., 123.36 µs) to transmit the maximum size frame and a time to transmit at least seven of the Class A frames (or the number of Class A frames minus one) and a portion of the eighth (or last) Class A frame. The blocking windows 452, 454 may not extend to an end of the Class A burst period to minimize delay from when non-Class A data is permitted to pass (no longer blocked) and time when the non-Class A data is actually forwarded from a respective queue to the first multiplexer 302 of FIG. 10.

Each blocking window provides a corresponding margin period (e.g., $Margin_{Min}$, $Margin_{Max}$). Non-Class A frames that are less than or equal to the minimum size frame may be transmitted during the margin period $Margin_{Min}$ (e.g., 367.36 µs). Non-Class A frames that are less than or equal to the maximum size frame may be transmitted during the margin period $Margin_{Max}$ (e.g., 267.84 µs). These margins provide boundaries upon which transmission determinations of other traffic or non-Class A frames including frames of a maximum size (e.g., 1522 bytes) may be based.

Figure 18A:
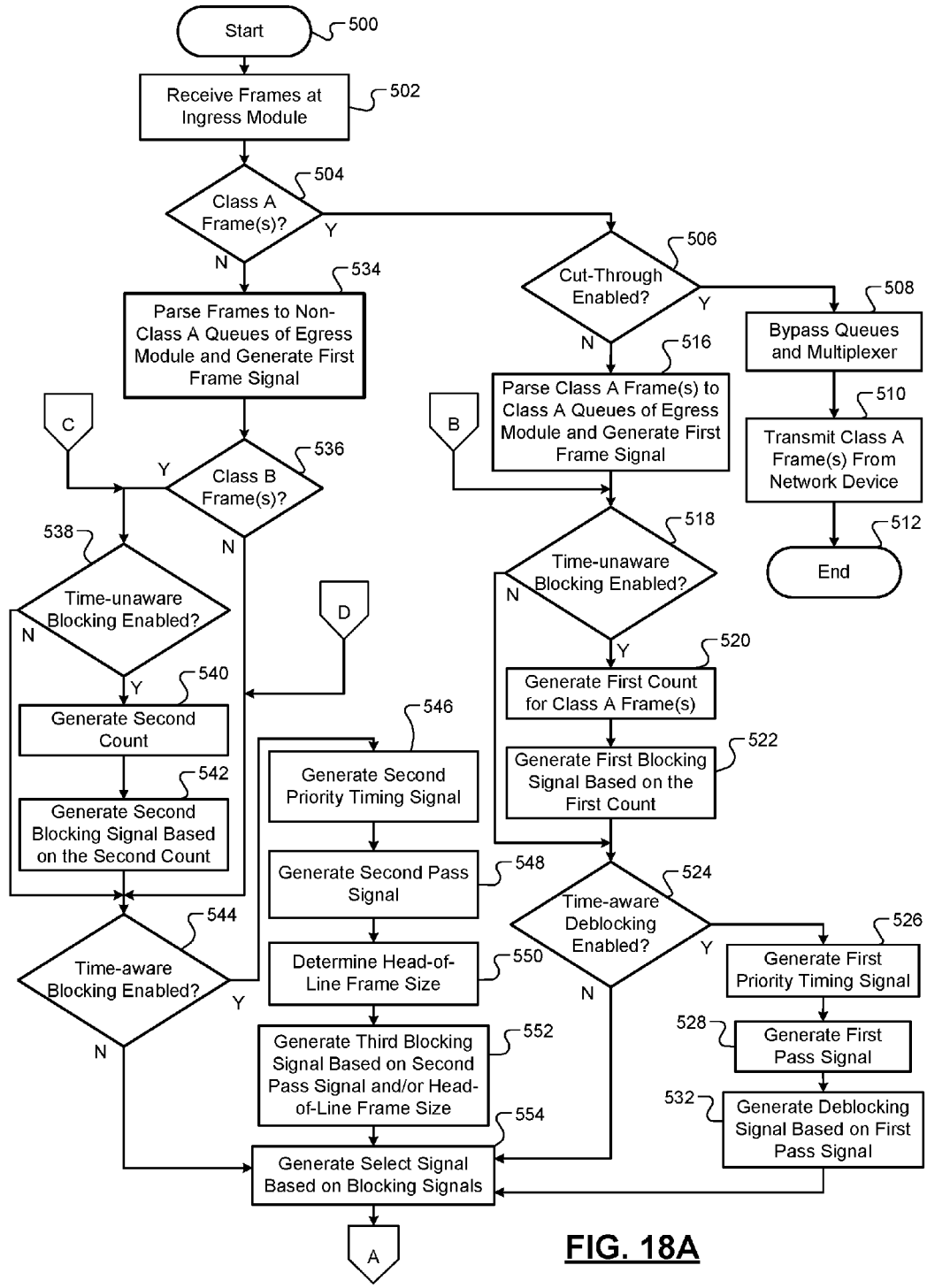
FIGS. 18A-18B illustrates a data blocking method in accordance with the present disclosure.
Figure 18B:
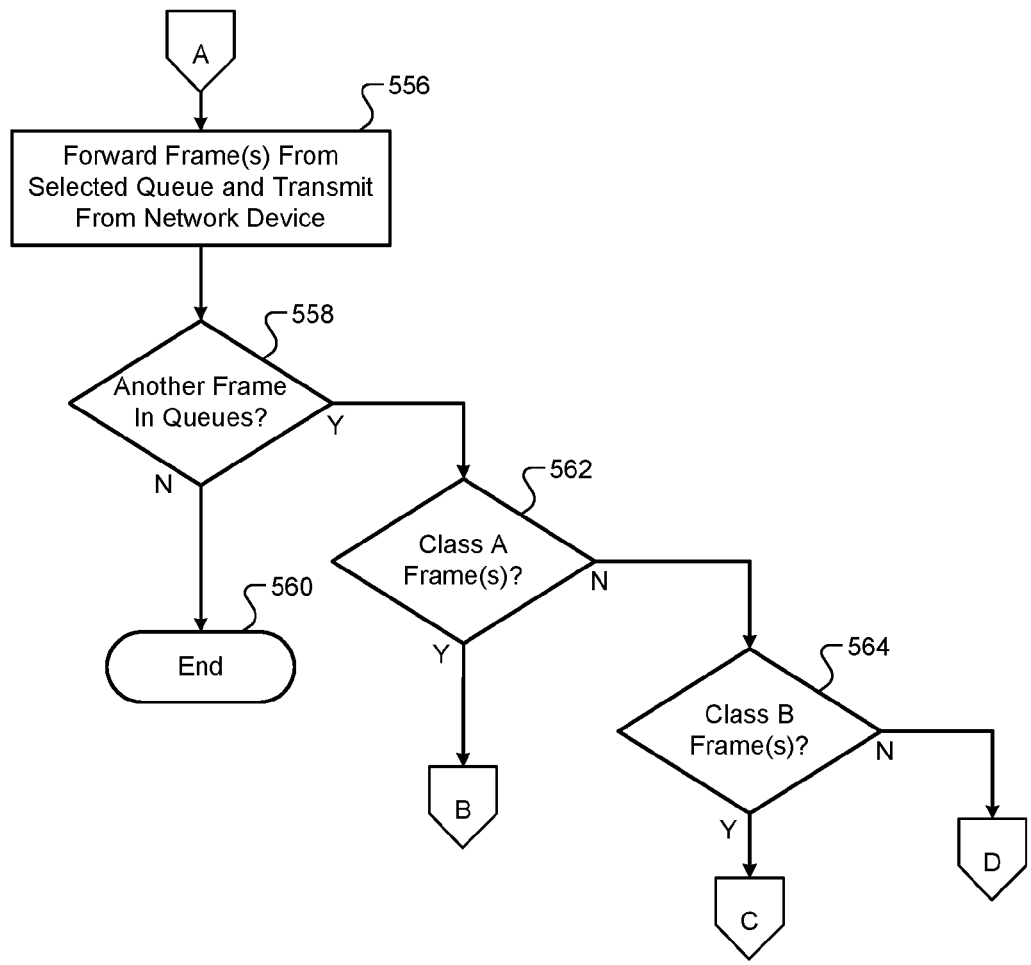

The network device 270 of FIG. 10 may be operated using numerous methods, an example method is provided by the method of FIGS. 18A and 18B. In FIGS. 18A and 18B, a data blocking method is shown. Although the following tasks are primarily described with respect to the implementations of FIGS. 10-16E, the tasks may be easily modified to apply to other implementations of the present disclosure. Also, although the following tasks are described with respect to a certain number of deblocking shapers, time-unaware blocking shapers, time-aware blocking shapers, and frames, the method may be easily modified to accommodate a different number of each. The tasks may be iteratively performed. The method may begin at 500.

At 502, the ingress module 272 receives frame(s). The frame(s) may be received from a host control module, a talker, a bridge, and/or a time translator device. At 504, the ingress module 272 parses the frame(s). The ingress module 272 may determine whether the frame(s) are Class A frame(s). If the frames are Class A frame(s), task 506 may be performed, otherwise task 534 is performed.

At 506, the egress module 274 may determine whether the cut-through mode is enabled. If the cut-through mode is enabled, task 508 is performed otherwise task 516 is performed. At 508, the Class A queue(s) 278, the time-unaware blocking shapers 294, the deblocking shaper(s) 292, and the first multiplexer 302 are bypassed and the second select signal is generated to select frame(s) from the ingress module 272 as opposed to selecting frame(s) from the first multiplexer 302. The Class A frame(s) are forwarded to the second multiplexer 312. At 510, the Class A frame(s) are transmitted from the egress module 274 and/or the network device 270. The method may end at 512.

At 516, the ingress module 272 parses the Class A frame(s) to the Class A queue(s) 278. The data pass module(s) (e.g., the data pass module 366) of the deblocking shaper(s) 360, the ingress module 272, and/or the egress module 274 may generate a first frame signal (e.g., PKT1). The first frame signal indicates that there is a Class A frame in a Class A queue.

At 518, the egress module 274 may determine whether time-unaware blocking is enabled. When time-unaware blocking is enabled, task 520 is performed, otherwise task 524 is performed. At 520, the first counter 322 of the time-unaware blocking shaper 294 may generate the first count. The first count may be generated as described with respect to FIGS. 11 and 12. At 522, a queue monitoring module (e.g., the queue monitoring module 324) generates a first blocking signal (e.g., the first blocking signal 350) based on the first count.

At 524, the egress module 274 may determine whether time-aware deblocking is enabled. Task 526 is performed when time-aware deblocking is enabled, otherwise task 554 is performed. At 526, the timing module 290 generates the first priority timing signal 368. The first priority timing signal 368 indicates when the Class A frame(s) are permitted to pass to the first multiplexer 302, as described above. At 528, the logic module 364 of the time-aware deblocking shaper 360 generates the first pass signal PASS1 based on the first priority timing signal 368. At 532, the data pass module 366 generates the deblocking signal 370 based on the first pass signal PASS1.

At 534, the ingress module 272 parses non-Class A frame(s) to respective ones of the non-Class A queues 280, 282. The data pass modules (e.g., the data pass modules 380, 400) of the time-aware blocking shapers 296 may generate respective frame signals indicating presence of frame(s) in corresponding ones of the non-Class A queues 280, 282. This may include generating the second frame signal PKT2, as described with respect to FIG. 14.

At 536, the egress module 274 may determine whether the frame(s) are Class B frame(s). When the frame(s) are Class B frame(s), task 538 is performed, otherwise task 544 is performed. Task 536 may not actually be performed. Tasks 538 and 544 may be performed based on whether there is Class B frame(s) in the Class B queue.

At 538, the egress module 274 may determine whether time-unaware blocking is enabled. If time-unaware blocking is enabled task 540 is performed, otherwise task 544 is performed. At 540, a time-unaware blocking shaper generates a second count for Class B frame(s). At 542, a queue monitoring module of the time-unaware blocking shaper generates a second blocking signal based on the second count.

At 544, the egress module 274 determines whether time-aware blocking is enabled. When time-aware blocking is enabled, task 546 is performed, otherwise task 554 is performed. At 546, the timing module 290 generates priority timing signal(s) (e.g., the second priority timing signal 388). The priority timing signal(s) may indicate when non-Class A frame(s) are to be blocked. At 548, data pass module(s) of the time-aware blocking shaper(s) generate pass signal(s) (e.g., the second pass signal PASS2) based on the priority timing signal(s) generated at 546.

At 550, the data pass modules of the time-aware blocking shapers may determine head-of-line frame sizes based on the descriptor signal 352. If more than one time-aware blocking shaper is used, the time-aware blocking shapers may share a single data pass module and/or the data pass modules may communicate with each other to coordinate passage of non-Class A frame(s) based on the priority levels and sizes of the head-of-line frame(s). Task 550 may be performed when the egress module 274 and/or the time-aware blocking shapers are configured to monitor sizes of head-of-line non-Class A frame(s) and forward as many non-Class A frame(s) that "fit" between Class A bursts and/or prior to a next Class A burst. Class B frame(s) that are sized to complete transmission before the next Class burst may be forwarded followed by the next largest size head-of-line frame. The largest sized head-of-line frame that can be transmitted prior to the next Class A burst may be transmitted prior to other non-Class A frame(s).

At 552, the time-aware blocking shaper(s) may generate third blocking signal(s) based on the pass signal(s) and/or the corresponding priority level(s) and/or size(s) of head-of-line frame(s).

At 554, the selector module 298 generates the first select signal based on the first blocking signal, the deblocking signal, the second blocking signal, and/or the third blocking signal(s). At 556, the first multiplexer 302 transmits frame(s) from a selected one of the queues$_{1-X}$ based on the first select signal. The second select signal is generated to select the frame(s) outputted from the first multiplexer 302 instead of selecting frame(s) from the ingress module 272.

At 558, the egress module 274 may determine whether there is additional frame(s) in the queues$_{1-X}$. If there are not additional frame(s) in the queues$_{1-X}$, the method may end at 560, otherwise task 562 may be performed. At 562, the egress module 274 may determine if the remaining frame(s) are Class A frames. If the remaining frame(s) are Class A frame(s), task 512 may be performed, otherwise task 564 may be performed. At 564, if the remaining frame(s) are Class B frame(s), task 538 may be performed, otherwise task 544 may be performed.

The above-described tasks are meant to be illustrative examples; the tasks may be performed sequentially, synchronously, simultaneously, continuously, during overlapping time periods or in a different order depending upon the application. Also, any of the tasks may not be performed or skipped depending on the implementation and/or sequence of events.

The above-disclosed techniques include non-arbitrary networks, which are engineered, managed, and controlled to minimize latency between end stations of the networks. By using the above-described implementations, a non-arbitrary network may satisfy the FE AVB generation 2 five hop latency requirement of less than or equal to 100 µs. The latency is equal to transmit time of a talker plus processing delay time associated with four bridges. As an example, time to transmit a control frame may be 12.0 µs for 150 bytes including 128 bytes of control data and 22 bytes overhead and no interfering frame. Processing delay time of one of the four bridges may be, for example, 22.0 µs including the 12 µs transmit time and the approximately two 512 bit times of bridge delay or 10.0 µs. Total latency is 100.0 µs, which includes the transmit time of 12.0 µs and bridge processing delay time of 88.0 µs (22.0 µs*4).

The apparatuses and methods described herein may be implemented by one or more computer programs executed by one or more processors. The computer programs include processor-executable instructions that are stored on a non-transitory tangible computer readable medium. The computer programs may also include stored data. Non-limiting examples of the non-transitory tangible computer readable medium are nonvolatile memory, magnetic storage, and optical storage.

What is claimed is:

1. A network device comprising:
   a first queue to receive a first plurality of frames, wherein the first plurality of frames have a first priority level;
   a second queue to receive a second plurality of frames, wherein the second plurality of frames have a second priority level, and wherein the second priority level is lower than the first priority level;
   a timing module to determine a start time of a burst period of the first plurality of frames, wherein the first plurality of frames are transmitted from the network device during the burst period; and
   a shaper to determine (i) a maximum size of one of the second plurality of frames, or (ii) a minimum size of one of the second plurality of frames, wherein the shaper is further to determine whether to block transmission of a head-of-line frame of the second plurality of frames from the network device based on (i) the maximum size, or (ii) the minimum size.

2. The network device of claim 1, wherein the first frame is received at the first queue subsequent to the second frame being received at the second queue.

3. The network device of claim 1, further comprising an ingress module to (i) receive the second plurality of frames, and (ii) generate a descriptor signal based on the second plurality of frames,
  wherein the shaper is to determine the size of the head-of-line frame based on a descriptor provided in the descriptor signal.

4. The network device of claim 1, further comprising a counter to indicate an amount of time until the start time,
  wherein the shaper is to block transmission of the head-of-line frame from the network device based on the amount of time until the start time.

5. The network device of claim 4, wherein the shaper is to:
  determine the size of the head-of-line frame of the second plurality of frames;
  block transmission of the head-of-line frame if an amount of time corresponding to the size of the head-of-line frame is greater than the amount of time until the start time; and
  permit transmission of the head-of-line frame if the amount of time corresponding to the size of the head-of-line frame is less than or equal to the amount of time until the start time.

6. The network device of claim 1, wherein the shaper is to:
  determine the maximum size of the one of the second plurality of frames; and
  block transmission of the head-of-line frame from the network device based on the maximum size.

7. The network device of claim 1, wherein the shaper is to permit transmission of the head-of-line frame if (i) a margin of time plus an amount of time associated with the maximum size is available prior to the start time, and (ii) the maximum size is less than the margin of available time.

8. The network device of claim 1, wherein the shaper is to:
  determine the minimum size of the one of the second plurality of frames; and
  block transmission of the head-of-line frame from the network device based on the minimum size.

9. The network device of claim 1, wherein the shaper is to permit transmission of the head-of-line frame if (i) a margin of time plus an amount of time associated with the minimum size is available prior to the start time, and (ii) the minimum size is less than the margin of available time.

10. The network device of claim 1, wherein:
  the shaper is to
    block transmission of the head-of-line frame from the network device based on at least one of (i) a predetermined number of the first plurality of frames, or (ii) an amount of time to transmit the predetermined number of the first plurality of frames, and
    permit transmission of the head-of-line frame subsequent to transmitting the predetermined number of the first plurality of frames and prior to completing transmission of one of the first plurality of frames; and
  the predetermined number of the first plurality of frames does not include the one of the first plurality of frames.

11. The network device of claim 10, wherein the one of the first plurality of frames is transmitted subsequent to transmission of the predetermined number of the first plurality of frames.

12. A method of operating a network device, wherein the network device comprises a first queue, a second queue, and a shaper, the method comprising:
  receiving a first plurality of frames at the first queue, wherein the first plurality of frames have a first priority level;
  receiving a second plurality of frames at the second queue, wherein the second plurality of frames have a second priority level, and wherein the second priority level is lower than the first priority level;
  determining a start time of a burst period of the first plurality of frames, wherein the first plurality of frames are transmitted from the network device during the burst period; and
  determining, via the shaper, (i) a maximum size of one of the second plurality of frames, or (ii) a minimum size of one of the second plurality of frames, wherein the shaper is further to determine whether to block transmission of a head-of-line frame of the second plurality of frames from the network device based on (i) the maximum size, or (ii) the minimum size.

13. The method of claim 12, wherein the first frame is received at the first queue subsequent to the second frame being received at the second queue.

14. The method of claim 12, further comprising:
  generating a descriptor signal based on the second plurality of frames; and
  determining, via the shaper, the size of the head-of-line frame based on a descriptor provided in the descriptor signal.

15. The method of claim 12, further comprising:
  determining the size of the head-of-line frame of the second plurality of frames;
  determining an amount of time until the start time; and
  blocking, via the shaper, transmission of the head-of-line frame from the network device based on the amount of time until the start time,
  wherein
    the transmission of the head-of-line frame is blocked by the shaper if an amount of time corresponding to the size of the head-of-line frame is greater than the amount of time until the start time; and
    the transmission of the head-of-line frame is permitted by the shaper if the amount of time corresponding to the size of the head-of-line frame is less than or equal to the amount of time until the start time.

16. The method of claim 12, further comprising determining the maximum size of the one of the second plurality of frames, wherein the transmission of the head-of-line frame from the network device is blocked by the shaper based on the maximum size.

17. The method of claim 12, wherein the transmission of the head-of-line frame is permitted by the shaper if (i) a margin of time plus an amount of time associated with the maximum size is available prior to the start time; and (ii) the maximum size is less than the margin of available time.

18. The method of claim 12, further comprising determining the minimum size of the one of the second plurality of frames, wherein the transmission of the head-of-line frame from the network device is blocked by the shaper based on the minimum size.

19. The method of claim 12, wherein the transmission of the head-of-line frame is permitted by the shaper if (i) a margin of time plus an amount of time associated with the minimum size is available prior to the start time; and (ii) the minimum size is less than the margin of available time.

20. The method of claim 12, wherein:
  the transmission of the head-of-line frame from the network device is blocked by the shaper based on at least one of (i) a predetermined number of the first plurality of frames, or (ii) an amount of time to transmit the predetermined number of the first plurality of frames;

the transmission of the head-of-line frame from the network device is permitted by the shaper subsequent to transmitting the predetermined number of the first plurality of frames and prior to completing transmission of one of the first plurality of frames; and the one of the first plurality of frames is transmitted subsequent to transmission of the predetermined number of the first plurality of frames.

21. A network device comprising:

a first queue to receive a first plurality of frames, wherein the first plurality of frames have a first priority level;

a second queue to receive a second plurality of frames, wherein the second plurality of frames have a second priority level, and wherein the second priority level is lower than the first priority level;

a timing module to determine a start time of a burst period of the first plurality of frames, wherein the first plurality of frames are transmitted from the network device during the burst period; and a shaper to determine (i) a size of a head-of-line frame of the second plurality of frames, (ii) a maximum size of one of the second plurality of frames, or (iii) a minimum size of one of the second plurality of frames, wherein the shaper is configured to block transmission of the head-of-line frame from the network device based on a clock signal and (i) the size of the head-of-line frame, (ii) the maximum size, or (iii) the minimum size, and wherein the clock signal is shared between the network device and other network devices in a non-arbitrary network.

22. A network device comprising, a first queue to receive a first plurality of frames, wherein the first plurality of frames have a first priority level;

a second queue to receive a second plurality of frames, wherein the second plurality of frames have a second priority level, and wherein the second priority level is lower than the first priority level;

a timing module to determine a start time of a burst period of the first plurality of frames, wherein the first plurality of frames are transmitted from the network device during the burst period; and a shaper to determine (i) a size of a head-of-line frame of the second plurality of frames, (ii) a maximum size of one of the second plurality of frames, or (iii) a minimum size of one of the second plurality of frames, wherein the shaper is further to determine whether to block transmission of the head-of-line frame from the network device based on (i) the size of the head-of-line frame, (ii) the maximum size, or (iii) the minimum size, wherein signals generated in the network device are generated based on a clock signal shared between the network device and other network devices in a non-arbitrary network.

23. The network device of claim 1, wherein the shaper is to:

determine (i) the size of the head-of-line frame of the second plurality of frames; and (ii) the maximum size of one of the second plurality of frames; and determine whether to block transmission of the head-of-line frame from the network device based on (i) the size of the head-of-line frame, and (ii) the maximum size.

24. The network device of claim 1, wherein the shaper is to:

determine (i) the size of the head-of-line frame of the second plurality of frames, and (ii) the minimum size of one of the second plurality of frames; and determine whether to block transmission of the head-of-line frame from the network device based on (i) the size of the head-of-line frame, and (ii) the minimum size.

25. A network device comprising:

a first queue receive a first plurality of frames, wherein the first plurality of frames have a first priority level;

a second queue to receive a second plurality of frames, wherein the second plurality of frames have a second priority level, and wherein the second priority level is lower than the first priority level;

a timing module to determine a start time of burst period of the first plurality of frames, wherein the first plurality of frames are transmitted from the network device during the burst period; and a shaper to (i) determine a maximum or minimum size of one of the second plurality of frames, and (ii) permit transmission of one or more of the second plurality of frames if the one or more of the second plurality of frames are sized to be transmitted within a margin period;

the margin period (i) occurs between two consecutive bursts of the first plurality of frames, (ii) begins at an end of a first one of the two consecutive bursts, and (iii) ends at a beginning of a blocking window; and a length of the blocking window is based on the maximum or minimum size and a size of a predetermined number of the first plurality of frames.

26. The network device of claim 25, wherein the predetermined number of the first plurality of frames includes some but not all of a second one of the two consecutive bursts of the first plurality of frames.

27. The network device of claim 1, wherein:

the shaper is to (i) determine the minimum size of the one of the second plurality of frames, and (ii) permit transmission of one or more of the second plurality of frames if the one or more of the second plurality of frames are sized to be transmitted within a margin period;

the margin period (i) occurs between two consecutive bursts of the first plurality of frames, (ii) begins at an end of a first one of the two consecutive bursts, and (iii) ends at a beginning of a blocking window; and a length of the blocking window is based on the minimum size and a size of a predetermined number of the first plurality of frames.

28. The network device of claim 27, wherein the predetermined number of the first plurality of frames includes some but not all of a second one of the two consecutive bursts of the first plurality of frames.

* * * * *